(12) United States Patent
Fougere et al.

(10) Patent No.: US 9,394,648 B2
(45) Date of Patent: Jul. 19, 2016

(54) TWO-STAGE CHEMI-MECHANICAL PRETREATMENT FOR LIGNOCELLULOSIC BIOMASS

(71) Applicant: University of New Brunswick, Fredericton (CA)

(72) Inventors: Dennis Fougere, Fall River (CA); Kecheng Li, Fredericton (CA)

(73) Assignee: UNIVERSITY OF NEW BRUNSWICK, Fredericton, NB (CA)

( * ) Notice: Subject to any disclaimer, the term of this patent is extended or adjusted under 35 U.S.C. 154(b) by 0 days.

(21) Appl. No.: 14/168,816

(22) Filed: Jan. 30, 2014

(65) Prior Publication Data

US 2014/0209261 A1 Jul. 31, 2014

Related U.S. Application Data

(60) Provisional application No. 61/758,377, filed on Jan. 30, 2013.

(51) Int. Cl.
*D21B 1/02* (2006.01)
*D21C 1/04* (2006.01)

(52) U.S. Cl.
CPC ........ *D21B 1/021* (2013.01); *D21C 1/04* (2013.01); *Y02E 50/16* (2013.01)

(58) Field of Classification Search
CPC .......... D21B 1/023; D21B 1/021; D21C 1/04; D21C 1/10
See application file for complete search history.

(56) References Cited

U.S. PATENT DOCUMENTS

2009/0298149 A1 12/2009 Wang et al.

OTHER PUBLICATIONS

Guay et al., Comparison of Fiber Length Analyzers, 2005, Tappi Practical Papermaking Cinference Processdings.*
Zhu et al., Specific surface to evaluate efficiencies of milling and pretreatment of wood for enzymatic saccharification, 2009 Chemical Engineering Science, 64, 474-485.*
Grace editor, Pulp and Paper Manufacture: Alkaline Pulping, 1989, The Joint Textbook Committee of the Paper Industry, vol. 5 3rd edition, p. 99.*
Hu "Pretreatment and Lignocellulosic Chemistry" Bioenerg. Res. (2012) 5:1043-1066.
Nguyen "Two-Stage Dilute-Acid Pretreatment of Softwoods" Applied Biochemistry and Biotechnology vol. 84-86, 2000.
Pingali "Breakdown of Cell Wall Nanostructure in dilute Acid Pretreated Biomass" Biomacromolecules 2010, 11, 2329-2335.
Samuel Structural Characterization and Comparison of Switchgrass Ball-milled Lignin Before and After Dilute Acid Pretreatment Appl Biochem Biotechnol (2010) 162:62-74.
Sluiter, A., Hames, B., Ruiz, R., Scarlata, C., Sluiter, J., & Templeton, D. (2008). Determination of Sugars, Byproducts, and Degradation Products in Liquid Fraction Process Samples. NREL Laboratory Analytical Procedure (LAP).

(Continued)

*Primary Examiner* — Anthony Calandra
(74) *Attorney, Agent, or Firm* — Lynn C. Schumacher; Stephen W. Leonard; Hill & Schumacher

(57) ABSTRACT

A process for pretreating lignocellulosic biomass that increases monomeric sugar yields in subsequent enzymatic hydrolysis and reduces specific energy consumption during production of the hydrolysable material. The pretreatment includes a chemical treatment followed by a mechanical size reduction such as a disc refining step, and includes a second chemical treatment, harsher than the first, which may precede or follow the size reduction.

1 Claim, 11 Drawing Sheets

(56) References Cited

OTHER PUBLICATIONS

Sluiter, A., Hames, B., Ruiz, R., Scarlata, C., Sluiter, J., Templeton, D., & Crocker, D. (2011). Determination of Structural Carbohydrates and Lignin in Biomass. NREL Laboratory Analytical Procedure (LAP).

Stone, J. E., & Scallan, A. M. (1968). A Structural Model for the Cell Wall of Water-Swollen Wood Pulp Fibers based on their Accessibility to Macrmolecules. Cellulose Chemistry and Technology, 2, 343-353.

Stone, J. E., Scallan, A. M., Donefer, E., & Ahlgren, E. (1969). Digestibility as a Simple Function of a Molecule of Similar Size to a Cellulase Enzyme. Advances in Chemistry, 95.

Tian "Comparisons of SPORL and Dilute Acid Pretreatments for Sugar and Ethanol Productions from Aspen", Biotechnol. Prog., 2011, vol. 27, No. 2.

Wang Biotechnology and Bioengineering, vol. 109, No. 2, Feb. 2012.

Zhu "Sulfite pretreatment (SPORL) for robust enzymatic saccharification of spruce and red pine" Bioresource Technology 100 (2009) 2411-2418.

* cited by examiner

TWO-STAGE CHEMI-MECHANICAL PRETREATMENT FOR LIGNOCELLULOSIC BIOMASS

FIELD OF THE INVENTION

The present invention relates to pretreatment of biomass that can be used for the production of cellulosic ethanol and other alcohol fuels via enzyme hydrolysis and fermentation. In particular aspects, the invention relates to the use of chemical processes in combination with a disc-refiner to decrease biomass recalcitrance, increase digestibility and reduce energy consumption during mechanical size reduction.

BACKGROUND

Cellulosic ethanol has been pursued as an alternative liquid fuel to petroleum derivatives, due to the environmental impact and non-renewability of current petroleum use. Production of ethanol from lignocellulosic biomass is a potentially carbon-neutral process, wherein any carbon dioxide released during combustion of ethanol would have been released by natural decomposition of the biomass. Furthermore, the bioconversion of lignocellulose to alcohol fuel also allows for the production of value-added biomaterials and biochemicals, such as furfural, acetic acid and lignin.

Enzyme hydrolysis of a cellulosic material results in the release of glucose monomers, which can be fermented and distilled into fuel-grade ethanol. Commercialization of this technology is dependent on high yields from enzymatic hydrolysis, yet hydrolysis yields from native biomass are generally less than 20% of component cellulose. This is due to biomass recalcitrance.

Recalcitrance is defined as the natural resistance of plant material to enzymatic and microbial degradation. It is an inherent feature of fiber wall structure, and is seen from the molecular level (i.e. cellulose strands organized into crystalline domains) up to the cellular level (i.e. cellulose fibrils arranged in layers, with pore space filled by hemicellulose and lignin). The result is restricted access to cellulose surface area and a loss of enzyme activity via non-productive binding with hemicellulose and lignin. Accessibility to cellulose within the pore structure is, in particular, a major factor impacting hydrolysis yields. To counteract this structural resistance to enzymes, pretreatment technology is employed prior to enzymatic hydrolysis.

Pretreatment technology uses chemical or mechanical action to alter biomass structure such that hydrolysis yields are maximized. As cellulose accessibility is lowered by the presence of lignin and hemicellulose, more pretreatment methods utilize chemical fractionation. This generally includes the removal of hemicellulose by acid hydrolysis, or the removal of lignin by alkalines or organic solvents. The fractionated polymers are often a source of value-added products, such as platform chemicals from hemicellulose and adhesives or fuel from lignin. The physical structure will generally be partially disintegrated and size-reduced to increase surface area. Technologies such as steam explosion, dilute acid, and organosolv have been shown to effectively increase hydrolysis yields to the desired level of over 90%.

Pretreatment of wood suffers from two major pitfalls. The first is the high cost of downsizing wood chips to fibers or powder. Most pretreatment methods designed from wood include a size-reduction step prior to chemical treatment to ensure effective cooking and maximum yields from enzyme hydrolysis. Comminution of wet wood consumes a prohibitive amount of energy, accounting for up to 30% of potential process costs for cellulosic ethanol.

Certain pretreatments can avoid the need for comminution, either by explosive depressurization (steam explosion) or the use of solvents (organosolv). However, these pretreatments suffer from the second pitfall, which is a lack of mature equipment and technologies. For both, the large scale reactors needed do not currently exist, thus implementing these pretreatments would be capital intensive. For a pretreatment to be commercially viable in the short-term the equipment used should be well-understood with a developed knowledge base available.

SUMMARY OF THE INVENTION

An aspect of the present invention is a method for treating a cellulose-containing material to ready it for downstream enzymatic hydrolysis. The material is typically lignocellulosic such as a woody biomass.

In an aspect, the invention includes steps of (a) providing a wood substrate physically reduced into wood chips; (b) mild treatment of chips in an aqueous solution containing an acid such as sulfuric acid; (c) severe treatment of chips in a second aqueous solution comprising an acid such as sulfuric acid; and (d) downsizing to wood fibers by disc refining.

In certain embodiments, the mild sulfuric acid treatment can be carried out at a process temperature between 120 and 220° C., for example between 150 and 180° C. The sulfuric acid treatment can be carried out at an acid charge of 0.1 to 3%, for example between 1 and 2%. The treatment time can be from 1 to 40 minutes, for example 10 to 20 minutes, or particularly 20 minutes.

In certain embodiments, the relatively severe sulfuric acid treatment can be carried out at a process temperature between 120 and 220° C., for example between 190 and 210° C. The sulfuric acid treatment can be carried out at an acid charge of 0.1 to 7%, for example between 3 and 5%. The treatment time can be from 1 to 40 minutes, for example 5 to 10 minutes.

In certain embodiments, a lignocellulose substrate produced can range from less than 0.1 mm to 6 mm in its smallest dimension. The material can consist of hardwood or softwood.

An aspect of the invention is a method of pretreating a lignocellulosic substrate while maintaining yields obtainable in subsequent enzyme hydrolysis, while reducing energy consumption from size reduction during the pretreatment.

In an aspect, the invention is a method for treating a cellulose-containing material, the method comprising the steps of:
(A) (a) providing a first mixture comprising the material and an aqueous first acid having a first concentration; and
   (b) subjecting the first mixture to a first dilute acid treatment under a first set of conditions comprising a first treatment temperature;
(B) (a) subsequent to step (A), forming a second mixture comprising material treated in step (A) and an aqueous second acid having a second concentration; and
   (b) subjecting the second mixture to a second dilute acid treatment under a second set of conditions comprising a second treatment temperature,
   wherein at least one of the following conditions is met:
      (i) the second treatment temperature is greater than the first treatment temperature;
      (ii) the second concentration is greater than the first concentration; and (iii) the mixture of step (A)(a) has a consistency that is greater than the consistency of the mixture step (B)(a); and (C) subsequent to step (A), subjecting the material to mechanical size reduction.

Step (A)(b) can include generating a hemicellulose-depleted material and sugars from the hemicellulose. Sugars obtained from the hemicellulose include e.g., xylose and mannose that result from the xylan/mannan making up part of the hemicellulose. In embodiments, step (A)(b) is carried out such that greater than 70, 80 or 90% of component hemicellulose is removed from the material with greater than 50, 60 or 70% of hydrolyzed hemicellulose being in the form of monomer and oligomer sugars. In a preferred embodiment, the material is depleted of greater than 90% of component hemicellulose with greater than 70% of hydrolyzed hemicellulose in the form of monomer and oligomer sugars. The depleted amount can be determined as described by Sluiter et al. (2011), or the appropriate TAPPI standard. The amount of hydrolyzed hemicellulose in the form of monomer and oligomer sugars can be determined via e.g., HPLC as described by (Sluiter et al., 2008). This also applies to measuring acid-soluble lignin.

The sugars, which are soluble in the aqueous medium in which they are generated, can then be removed i.e., separated from the product mixture of step (A)(b).

Acid can be provided by sulfuric acid, sulfur dioxide, sulfurous acid, hydrochloric acid, oxalic acid, or hydrogen peroxide, or a mixture of any one or more of the foregoing. In disclosed embodiments, the acid is provided by sulfuric acid, in both of the relatively mild acid treatment and the subsequent harsh acid treatment steps.

According to an embodiment, the aqueous first acid includes an aqueous solution of sulfuric acid present in an amount of between about 0.1 and about 5.0% (w/w) of the solution. Other possible amounts include sulfuric acid between about 0.5 and about 5.0%, or between about 1.0 and about 4.0%, or between about 1.0 and about 3.5%, or between about 1 and about 3.0%, or between about 1.0 and about 2.5%, or between about 1.0 and about 2.0%, or preferably between about 1.0 and about 1.5% (w/w).

According to an aspect, the first treatment temperature is between about 100 and about 220° C., but it can be between about 100 and about 210° C., or about 100 and 200° C., or about 100 and about 190° C., or about 100 and about 180° C., or about 110 and about 180° C., or about 120 and about 180° C., or about 130 and about 180° C., or about 140 and about 180° C. As explained in greater detail below, the first acid treatment step is relatively mild compared to the subsequent acid treatment step, and the preferred temperature is not above about 180° C., but is usually above 150° C.

According to an aspect, the mixture of step (A)(a) has a consistency of between about 5 to about 30%, but the consistency can also be between about 10 and about 30%, or about 15 and about 30%, or about 20 and about 30%, or about 5 and about 25%, or about 10 and about 25%, or about 15 and about 25%, or preferably between about 20 and about 25%.

For the purposes of this specification, consistency of a material is defined as:

$$\frac{\text{Weight of dry material}}{\text{Weight of dry material} + \text{liquid}} \times 100\%.$$

In the case of a woody material, dry material such as the wood chips of the examples, is oven-dry (od) material (105° C.) unless otherwise specified.

Step (A)(b) is typically conducted for a period of time between about 1 and about 40 minutes, but can be between about 5 and about 40 minutes, or about 10 and about 40 minutes, or about 15 and about 40 minutes, or about 20 and about 40 minutes, or about 5 and about 35 minutes, or about 10 and about 30 minutes, or about 15 and about 30 minutes, or about 15 and about 35 minutes, or about 15 and about 30 minutes or about 15 and about 25 minutes, or the first mild acid treatment step can be about 10, about 15, about 20 or about 25 minutes.

As for the first relatively mild acid treatment step, the acid of mixture of step (B) can be one or more of sulfuric acid, sulfur dioxide, sulfurous acid, hydrochloric acid, oxalic acid and hydrogen peroxide. In the illustrated embodiments, the acid of mixture of step (B) is sulfuric acid. The acid can be an aqueous solution of the sulfuric acid present in an amount of between about 0.1 and about 10.0% (w/w) of the solution, but it can be between about 0.5 and about 10.0%, or between about 1.0 and about 10.0%, or between about 2.0 and about 10.0%, or between about 3.0 and about 10.0%, or between about 4.0 and about 10.0%, or between about 5.0 and about 10.0%, or between about 2.0 and about 9.0%, or between about 2.0 and about 8.0%, or between about 2.0 and about 7.0%, or between about 3.0 and about 9.0%, or between about 3.0 and about 8.0%, or between about 3.0 and about 7.0%, or between about 4.0 and about 9.0%, or between about 4.0 and about 8.0%, or between about 4.0 and about 7.0%, or between about 5.0 and about 9.0%, or between about 5.0 and about 8.0%, or between about 5.0 and about 7.0%, or about 5.0 or about 6.0 or about 7% (w/w).

The second acid treatment step is typically conducted at a temperature that is between about 100 and about 220° C., or about 110 and about 220° C., or about 120 and 220° C., or about 130 and about 220° C., or about 140 and about 220° C., or about 150 and about 220° C., or about 160 and about 220° C., or about 170 and about 220° C., or about 180 and about 220° C., or about 180 and about 210° C., or about 190 and about 210° C., or about 190° C. or about 200° C. or about 210° C. As explained further in connection with disclosed embodiments, the second step, being relatively harsh compared to the first acid treatment step, is conducted at a higher temperature than the first step, and is usually at least 190° C., up to about 210° C.

The mixture of step (B)(a) typically has a consistency of between about 5 to about 30%, or about 10 and about 30%, or about 15 and about 30%, or about 20 and about 30%, or about 5 and about 25%, or about 10 and about 25%, or about 15 and about 25%, or preferably between about 20 and about 25%.

In embodiments, step (B)(b) is conducted for a period of time between about 1 and about 35 minutes, or about 5 and about 30 minutes, or about 2 and about 30 minutes, or about 2 and about 20 minutes, or about 2 and about 10 minutes, or about 5 and about 35 minutes, or about 5 and about 30 minutes, or about 5 and about 25 minutes, or about 5 and about 20 minutes, or about 5 and about 15 minutes or about 5 and about 10 minutes, or about 5, about 6, about 7, about 8, about 9, or about 10 minutes.

Mechanical size reduction of step (C) can be accomplished through the use of disc refining, hammer milling, attrition milling, knife milling or ball milling, but it is likely preferred to be by disc refining, the mechanical size reduction process used in exemplifying the feasibility of the invention. Typically, the consistency of the material that is disc refined is adjusted to be between about 5 and about 100% prior to refining, or to a consistency of between about 5 and 65%, or between about 10 and about 65%. A preferred range of consistency is from about 20 to about 65%.

In embodiments, the mechanical size reduction of step (C) is conducted so as to produce material e.g., refined wood chip material having an average length of between about 0.01 mm and about 6 mm, preferably between about 0.1 and about 2 mm.

The milling or refining of step (C) can include refining the material to produce fiber bundles having a width between 0.01 mm and 0.4 mm, preferably between about 0.04 mm and about 0.2 mm, which should provide fiber bundles of a size suitable for enzymatic hydrolysis.

In a preferred aspect, step (C) is carried out subsequent to step (B), so that the overall order of the primary steps is (A), (B) and (C). One or more suitable steps may precede step (A), and/or be present between steps (A) and (B), and/or be present between steps (B) and (C), and/or follow step (C).

Conditions (i), (ii) and (iii) of step (B)(b) can be selected so as to reduce net specific energy consumed in step (C) by at least 95 percent when compared to untreated material i.e., material prior to treatment in step (A).

In embodiments, the mechanical size reduction of step (C) includes disc refining the material to a Canadian Standard Freeness (CSF) below about 800, more typically below 700, 650, 600, 550 or 500 ml. In a preferred embodiment, material is disc refined to 500 ml or less. CSF is determined according to TAPPI T 227.

The method can of course additionally include a step (D), enzymatically hydrolyzing the material of step (C) to produce glucose. Again, there may be intervening steps between steps (C) and (D). Optimally, the molar yield of glucose produced is high, at least 70% based on the cellulose content of the material of step (A)(a), or at least 75%, or at least 80%, or at least 85% or at least 90%.

Glucose obtained may be fermented in a step (E), to produce ethanol.

A preferred lignocellulosic starting material is wood chips. The chips can be, for example, hardwood or softwood. "Wood chips" are small pieces of wood usually of generally uniform size and shape produced from e.g., tree trunks by mechanical treatment (chipping) with tools such as knives. Length along the grain direction is typically between 5 and 50 mm. Average length of wood chips can thus be up to about 50 mm, or between 5 and 50 mm, or between 10 and 45 mm, or between 15 and 40 mm. The wood chips may be shipped to site, or can be prepared on site, and as desired used directly as material of step (A). Preparing wood chips on site could include chipping tree trunks and or limbs to a size suitable for use according to other steps of the invention.

More generally, in the context of this invention, lignocellulosic material includes terrestrial plant cell wall material containing primarily lignin, cellulose and hemicellulose (>90%). The material can include herbaceous biomass such as grasses, straws, trimmings, etc., and woody biomass including hardwoods and softwoods.

Other embodiments are discussed throughout this application. Any embodiment discussed with respect to one aspect of the invention applies to other aspects of the invention as well and vice versa. The embodiments in examples are understood to be embodiments of the invention that are applicable to all aspects of the invention.

The word "a" or "an" when used in conjunction with the term "comprising" in the claims and/or the specification means "one or more," "at least one," and "one or more than one."

The term "about" is used to indicate that a value includes the standard deviation of error for the device or method being employed to determine the value.

The use of the term "or" in the claims is used to mean "and/or" unless explicitly indicated to refer to alternatives only or the alternatives are mutually exclusive, although the disclosure supports a definition that refers to only alternatives and "and/or."

The words "comprising" and any form, such as "comprise" and "comprises", "having" and any form of having, "including" and any form of including, or "containing" and any form of containing, are inclusive or open-ended and do not exclude additional, unrecited elements or method steps.

It is to be understood that both the foregoing general description and the following detailed description are exemplary and explanatory only and are only intended to provide a further explanation of the present invention as claimed.

BRIEF DESCRIPTION OF THE DRAWINGS

Embodiments illustrating the invention and establishing feasibility of various aspects thereof are described below with reference to the accompanying drawings, in which.

DETAILED DESCRIPTION

Figure 1:
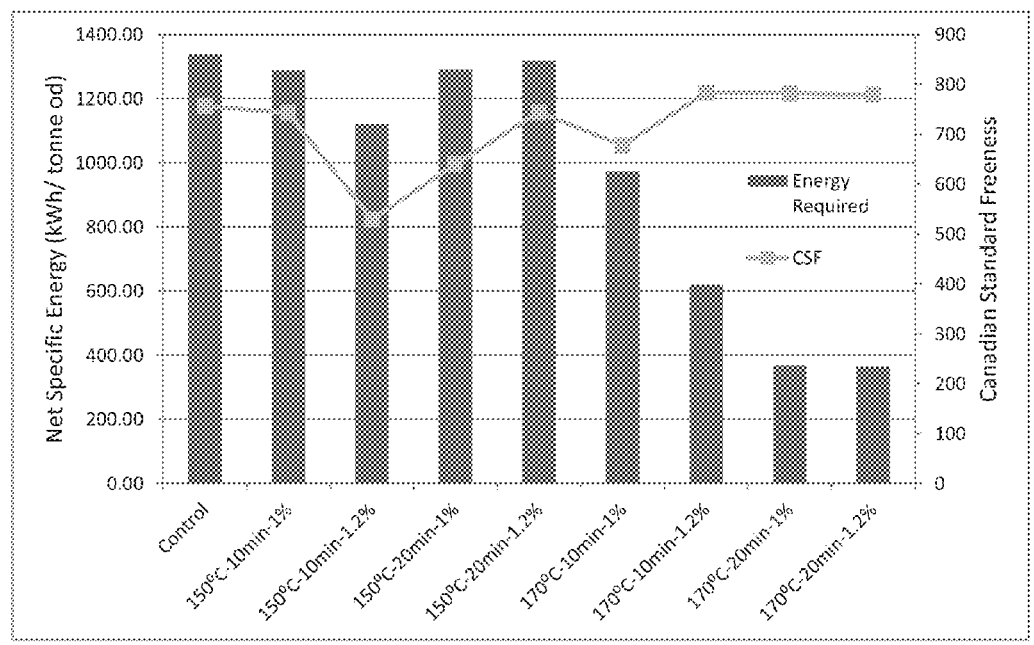
FIG. 1 shows net specific energy (NSE) consumption during disc refining of aspen wood chips treated by dilute sulfuric acid at low-consistency and variable treatment time, treatment temperature and acid charge.

The goal of pretreatment technology is to produce a lignocellulosic substrate which is at least 90% digestible. That is, when the substrate undergoes enzymatic hydrolysis using a cellulase enzyme mixture, i.e. Celluclast 1.5 L or CTec, 90% of the component cellulose is converted to glucose monomer. A number of pretreatments have achieved this level of digestibility for different substrates, but have not considered the realistic cost of producing this end-product, both in terms of operational costs and capital costs.

To achieve digestibility of 90% or greater, some degree of size reduction is needed to a size of 6 mm or smaller. Achieving such a size via comminution is an energy-intensive process. Given the relatively low energy density of wood, and the increased cost of transport compared to oil, operational costs for a viable pretreatment process must be minimized. Utilizing grasses does not benefit operational costs, as the energy density is decreased and transportation costs increased compared to wood.

Pretreatments which utilize steam explosion or organosolv processes can avoid high-cost comminution. However these processes make use of untested equipment that has been primarily tested at the lab-scale. Testing of the reactor equipment needed for these pretreatments is limited on a plant-scale. This inflates the capital cost of any plant that will focus primarily on ethanol production. Given the limitations of biomass mentioned previously (low energy density, high transportation costs), increased capital costs will decrease the viability of a given pretreatment.

Provided is a method for producing a highly digestible substrate, termed two-stage chemimechanical pretreatment. The method, in certain embodiments, employs a two-stage chemical treatment on wood chips in combination with disc refining to create a digestible fiber substrate.

Two-Stage Chemimechanical Treatment

In certain embodiments, the provided invention relates to methods where (a) a woody biomass is provided in chip form; (b) wood chips are treated at mild conditions in an aqueous solution comprised of sulfuric acid; (c) wood chips are treated again at a severe condition in a separate solution comprised of sulfuric acid; and (d) acid-treated wood chips undergo downsizing by mechanical refining.

A substrate produced by the methods presented has a number of features which benefit enzymatic hydrolysis. Acid hydrolysis of hemicellulose at elevated temperatures (>150° C.) results in the breakdown of xylan or mannan into sugar oligomers and monomers, along with minor sugar components. Xylan and mannan within the fiber structure are both chemical and mechanical inhibitors of cellulase. Addition of xylose to an ongoing enzymatic hydrolysis has been shown to inhibit cellulase enzymes, lowering glucose yields. Xylan/mannan also occupy the pore space between cellulose fibrils, and removing these hemicelluloses has been shown to increase pore volume accessible to cellulase within the fiber structure. It has been suggested that accessible pore volume accounts for up to 90% of variation in the digestibility of lignocellulosic substrates.

For single-stage pretreatment of softwood, treatments in an acid solution must be run at a high temperature (190-210° C.). Due to the high severity of these treatments, hemicellulose sugars which have been hydrolyzed are further degraded into inhibitory products, including furans and organic acids. These degradation products inhibit or destroy the enzymes and microorganisms employed during the enzyme hydrolysis and fermentation steps, thus lowering achievable yield. Due to these reasons, removal of the liquid fraction is generally needed prior to these steps. Since the liquor is a mix of sugars and degradation products, the recovery of either is more difficult and less profitable. As the dissolved material in the liquid fraction can account for 25-40% of the original wood mass, this is a significant loss of feedstock which could be better utilized. Furthermore, water-treatment for this stream would be expensive due to the high levels of carbohydrates.

In the two-stage treatment previously described, the initial aqueous treatment is run at lower severity, such that xylan/mannan sugars are released but not further degraded. The liquid fraction can then be recovered prior to the second treatment and be utilized. For softwood biomass, the liquid stream will be comprised on primarily 6-carbon sugars which can be directly fed into the fermentation reaction. For xylose-rich grasses or hardwood, the majority of hemicellulose sugars are 5-carbon. These sugars are not fermented by current microorganisms but could be utilized in the future. Another option is the generation of value-added products from the hemicellulose sugar steams. Platform chemicals, such as furfural, 5-hydroxymethyl furfural and acetic acid can be produced from 5-carbon and 6-carbon sugars via dehydration in a high-temperature acidic liquor. The second acid treatment can then be applied at higher severity to increase substrate digestibility to required levels. As the hemicellulose fraction has already been removed, the generation of degradation products is significantly lowered.

The provided invention, in certain embodiments, provides a method for developing a digestible substrate which is easily adapted to technology that is currently in use in the pulp and paper industry.

Energy Consumption During Size Reduction

Some degree of downsizing from chips to particles is needed to achieve satisfactory hydrolysis yields. For native wood, the cost of comminution can be exorbitant. The present invention, in certain embodiments, provides methods for decreasing energy consumption during disc refining.

Treatment of wood biomass by sulfuric acid creates a number of changes in wood structure that can decrease the energy needed for comminution. When wood is refined below the lignin glass temperature, the fracture point between fibers is generally located within the fiber wall, rather than the lignin-rich middle lamina. The cell wall structure contains cellulose chains arranged in microfibrils, reinforced by hemicellulose and lignin. In particular, hemicellulose is cross-linked with cellulose and acts as a binding agent with lignin.

Sulfuric acid treatment can be seen to decrease energy consumption during refining by two primary mechanisms. Acid hydrolysis of cellulose results in a decrease in the average degree of polymerization (DP) of cellulose chains, therefore weakening microfibril strength. During the disc-refiner process the energy needed to break microfibril bonds should then be reduced. As hemicellulose acts to bind together lignin and cellulose, the removal of most to all hemicellulose via acid hydrolysis will decrease the energy required to separate the lignin-rich middle lamella from the cellulose-rich cell wall.

Fibers Versus Powder

Comminution of wood during pretreatment is generally achieved using some form of dry grinding, such as knife-milling or hammer-milling. These processes will generally fracture wood chips into smaller particles via a cutting action. The resulting substrate therefore consists of cut or truncated fiber bundles. Disc-refining of wood results in a markedly different substrate, as a disc-refiner will generally fracture the wood substrate at the fiber-fiber interface. This results in the production of single fibers as opposed to fiber bundles.

For a particle of a given size, fibers will have significantly increased external surface area compared to powders. The structure of these particles is also non-homogenous. A fiber is, in general, a single wood cell. Powder consists of multiple fiber fragments together in a bundle. The bundling of multiple fiber walls together may limit access to the internal pore structure by increasing the average pore depth.

Fibers from refining will usually show some development of the fiber wall. This refers to the partial stripping of the primary wall and fibrillation of the primary and secondary wall. This may result in increased surface over that determined by the basic geometric shape, further benefiting digestibility to cellulase enzymes.

Surface Lignin Distribution

A common effect of high-temperature dilute acid pretreatment of wood or grass particles is that the surface of the particles become coated in small (100-200 nm) lignin spheres. This phenomenon is thought to be due to the recondensation of lignin on the surface following acid pretreatment. The presence of lignin spheres could decrease the enzyme digestibility of the pretreated substrate via two methods. The first is physical blocking of cellulose surface, particularly if access to pore space becomes blocked. The second is an increase in the non-productive binding of cellulase enzymes onto lignin, as surface lignin spheres would provide accessible lignin surface area for enzyme adsorption.

In certain embodiments, the chemi-mechanical pretreatment process involves acid-treatment of wood chips followed by disc-refining. When wood chips undergo acid-treatment, this lignin redeposition effect will be lessened, as the wood chips have significantly less surface area than wood particles for the lignin to become redeposited on. When disc-refining does not take place until after acid treatment steps, cellulose-rich surfaces can be produced by separating individual fibers without the issue of subsequent lignin deposition onto said surface.

Inter-Stage Disc-Refining

In certain embodiments, the invention involves treating wood chips in a sulfuric acid liquor, followed by disc-refining to a pulp, followed by a second treatment in an acidic liquor. In this embodiment, the degree of refining prior to the second acidic treatment is optimized to benefit digestibility while minimizing net specific energy consumption during disc-refining. For enzyme hydrolysis, it is ideal for the fiber walls of the lignocellulose to be wholly exposed. This would involve wood chips being disc-refined down to the level of single fibers.

However, the second acid-treatment will further reduce the particle size via hydrolysis of cellulose and hemicellulose polymers. Therefore, degree of refining should be in the range of small fiber bundles with 2-10 fibers conjoined. Further particle size reduction can then be achieved via the second acid-treatment, and the required energy for mechanical downsizing can be minimized.

Aqueous Treatment of Wood Chips

In certain embodiments, wood chips are treated in an aqueous acidic solution. Treatment in chip form provides multiple benefits over the aqueous treatment of wood particles. As the water retention of wood chips is lower, aqueous treatment can be run at higher solids loading, thus reducing the amount of water consumed. Reducing the water used also reduces the amount of energy needed for heating to the targeted temperature. Furthermore, following the acid treatment the liquid fraction is more concentrated, allowing easier recovery of sugars or side-products.

A further benefit of wood chip treatment is reducing the surface area for lignin redeposition. Lignin deposition is a common phenomenon when lignocellulose particles undergo high temperature aqueous treatment in acidic liquor. Portions of the lignin will dissolve and redeposit on the particle surface in the form of small spheres. These lignin spheres could lower enzyme digestibility by blocking pore volume or increasing non-productive binding between lignin and cellulase enzymes. As the available surface area of wood chips is significantly lower than for wood particles, the lignin redeposition effect should be minimized.

Inhibitor Production

The following invention makes use of sulfuric acid treatment of wood chips. Generally, for dilute acid pretreatment, aqueous treatment comprised of sulfuric acid is used for size reduced substrates. Treatment of wood chips could reduce inhibitor production for a given acid charge by reducing effective temperature in the chip due to decreased heat transfer during cooking.

In certain embodiments, the present invention employs sequential treatment of wood chips with a sulfuric acid treatment followed by a second acid treatment after refining. Such a combination can significantly reduce inhibitor production. As the second acid treatment will be employed to increase cellulose digestibility, this means a low severity acid treatment can be used initially. This lower severity acid treatment will remove the majority of hemicellulose sugars while producing less inhibitory products.

EXPERIMENTAL SECTION

Materials and Methods

A. Materials

The effectiveness of Two-stage Chemi-mechanical pretreatment was demonstrated using two materials: fresh Aspen and Spruce wood chips. Chips were obtained from the AV Nackawic mill in New Brunswick, Canada, and from a Resolute Forestry Products mill in Quebec, Canada, respectively. Received chips were separated using a chip classifier such that the smallest dimension was <8 mm and the larger two dimensions between 1.3 cm and 3.2 cm. Chips were then stored at 4° C. on-site.

B. Chemical Treatment

Wood chips and wood particles were chemically treated using a rotating autoclave-type digester. The digester made use of cylindrical bombs within a rotating cage for treatment. The cage held four bombs per treatment, and each bomb had a volume of 600 ml and a typical batch weight of 50-65 g oven dried (od). Maximum temperature ramp for the system was 2.5° C./min; resulting in temperature ramp times between 20-30 min. Time for cool-down to below 100° C. was less than 10 minutes for all samples. Conditions altered include treatment temperature (in ° C.), treatment time (in minutes), consistency or percent solids (in % con) and acid charge per gram od wood (in % AC). The maximum achievable temperature for the rotating digester was 175° C.

For high-temperature chemical treatment, a small scale Parr reactor was used. This digester consisted of a small cylindrical bomb that was sealed and heated using an electric jacket. The maximum allowable volume per run was 450 ml, and batch weight was maintained at 20 g od.

Samples were stewed in sulfuric acid liquor 12 hours prior to treatment. This was to ensure equal penetration of acid between different samples and to minimize variation in liquor penetration due to preparation time. As thorough liquor penetration into wood chips can be achieved via pre-steaming and impregnation steps, differences in penetration due to substrate size (chip vs. pulp/powder) were negated via stewing in the following examples. Following treatment, chips/particles were filtered by Fisher P8 filter paper and washed thoroughly. Treated samples were stored at 4° C. on-site.

To simplify the comparison of acid-treatments performed at different conditions, the severity factor was used. The severity factor is defined as:

$$R_0 = t \times \exp[T_h - T_r / 14.75]$$

Where t is time (min), $T_h$ is the treatment temperature and $T_r$ is the reference temperature (100° C.). A combined severity factor can then be calculated, which takes acidity into account:

$$\log CS = \log R_0 - \text{pH}$$

C. Mechanical Downsizing

Samples were downsized by either refining or grinding. Samples were refined using a Kumagai Riki Kogyo (KRK) high-consistency disc refiner. The KRK refiner is a single-disc model with a plate size of 12 inches, and speed of 3000 RPM. For all sample groups disc gap varied from 0.1 to 3.0 mm and consistency was set at 25%. Refining rate ranged from 50-60 g od per minute, with sample sizes ranging from 130-150 g od. Energy consumed during refining was monitored via an Ion 7330 power meter. Energy consumption recorded while no material was passing through the disc-refiner is referred to as idle energy. Energy consumption values are presented as Gross Specific Energy (GSE) and Net Specific Energy (NSE), where GSE is the recorded energy divided by throughput and NSE is the recorded energy minus idle energy divided by throughput.

Grinding was carried out using a Thomas Scientific Model 4 Wiley Mill (800 RPM at 60 Hz or 667 rpm at 50 Hz, Swedesboro, N.J.). Sieve sizes of 1 mm, 2 mm, 4 mm and 6 mm were used to produce powders of varying sizes.

Wood chips were dried for 7 days prior to grinding, as the Wiley mill is unable to mill wet wood. For certain samples, wood chips were dried for 7 days then re-wetted prior to refining. This was to allow comparison of ground and refined samples while controlling for degree of drying, which can impact downstream testing.

Certain samples were separated into size fractions via Bauer-McNett screening. This was to reduce the impact of particle size after mechanical treatments for certain comparisons. When referring to fractionated samples, "P" indicates that a sample passed a certain mesh size and "R" indicates that a sample was retained on a certain mesh size. Within the examples provided, mesh sizes of 14, 30 and 50 were used.

D. Enzymatic Hydrolysis

Prepared samples were tested for cellulase digestibility at multiple time points, including 0, 2, 24 and 48 hours. A complete cellulase system, Celluclast 1.5 L, was used for hydrolysis and was supplemented with Novozyme 188, a β-glucosidase. Doses for each hydrolysis were 15 FPU/g glucan of Celluclast 1.5 L and 22.5 CBU/g glucan of Novozyme 188. Hydrolysis conditions were set at a temperature of 50° C., pH of 4.8 and a mass consistency of 2%. To end hydrolysis at the mentioned time points, samples were boiled for 5 minutes to denature any active enzymes. Samples were then cooled to room temperature in an ice bath and suction filtered using Whatman #4 filter paper (cat no. 1004185). Enzyme hydrolysis yields were determined based on grams of sugar released per gram of component cellulose. In certain aspects of the invention, cellulose conversion or enzyme digestibility refers to enzyme hydrolysis yield. Sugar concentration was determined using a YSI 2700D Select Biochemistry Analyzer (Transition Technologies, Model 2700, Toronto, Ontario).

E. Analytical Methods

Compositional analysis was carried out on an extractive-free basis, with extractives removed via the TAPPI T204 standard method. Analysis included a strong acid hydrolysis of 0.3000 g of sample in 3 ml of 72% sulfuric acid at 30° C. for 1 hour in a shaking water incubator at 200 RPM (Thermo Fisher Scientific, Model 4450, Waltham, Mass.). Samples were then diluted with 84 ml of water to 4% sulfuric acid and underwent dilute acid hydrolysis at 121° C. for 1 hour. Filtrate was suction filtered through fine glass crucibles and the filtrate analyzed by Ion Chromatography, providing component glucose, xylose, mannose, rhamnose, galactose and arabinose. Total lignin was determined as the addition of Klason lignin and acid-soluble lignin. Acid-soluble lignin was determined by UV spectrometry using a wavelength of 240 nm. Klason lignin was determined as the mass remaining following acid hydrolysis, minus ash. Ash was determined as described in TAPPI standard T413.

F. Sample Characterization

Accessible pore volume was determined using the Solute Exclusion Technique first developed by Stone and Scallan (1968). This method determines the pore volume that is accessible to a set of dextrin probes ranging in size from 4 Å to 500 Å. The dextrin fractions and α-D-glucose used were obtained from Sigma-Aldrich Canada Ltd (Oakville, Ontario). Changes in dextrin concentration following contact with the wet substrate were determined using a Rudolph Autopol II polarimeter with a resolution of 0.001°, a 589 nm filter and an accuracy of ±0.01° (Rudolph Research Analytical, Hackettstown, N.J.). It was assumed that the pore structure was wholly inaccessible to the largest dextrin faction (~500 Å), allowing the calculation of a total specific pore volume, termed the Fiber Saturation Point (FSP) (Stone & Scallon, 1968) [2].

Canadian Standard Freeness (CSF) was measured for a set of refined acid-treated wood chips for easier comparison of energy consumption during downsizing. The work was carried out as described in TAPPI T227. This method is generally used to determine degree of refining for pulp, and is determined by both particle size and shape. It is used as an estimate of particle size and fibrillation, to allow more accurate comparison of energy consumption during disc refining of pretreated wood chips.

Light microscope images were taken using a Leica DM4000M microscope. Slides were prepared using mixtures with a consistency of less than 5%. At least 3 slides were prepared and a minimum of 30 images taken per sample. For fractionated samples, image analysis of microscopy images was used to estimate particle size for fractionated samples. ImageJ was used to measure length and width of particles in microscope images. At least 120 particles were measured to provide an estimate of size. Overall size of particles was calculated as projected area, equal to the product of a particles length and width.

A Fiber Quality Analyzer (FQA, LDA 96074, OpTest Equipment, Canada) was used to obtain detailed data for non-fractionated downsized substrates. The FQA was run as outline in the operation manual to determine fiber length, fiber coarseness and percent fines. Each sample was run in triplicate, with each run measuring over 1000 separate fibers.

Images of pretreated substrates were taken using a Field-Emission Scanning Electron Microscope. Samples were dehydrated via an ethanol series, i.e. soaked in 30-100% ethanol in sequence. Samples were then dried using a Critical Point Drier, after which they were mounted on carbon tape and coated with carbon. Images of samples were then obtained digitally using a Hitachi SU-70 Field Emission Gun SEM operated at 5 kV.

Example 1

Effect of Low-Consistency Acid Treatment on NSE Consumption During Disc-Refining of Aspen Wood Chips The NSE consumed to downsize a set of acid-treated wood chips to a specified CSF is outlined in FIG. 1. In certain aspects of the invention, hardwood chips undergo a single- or two-stage acid treatment prior to mechanical downsizing using a disc-refiner. As can be seen in FIG. 1, low-consistency acid-treatment of wood chips markedly reduces the NSE consumed during disc-refining. The decrease in NSE consumption is affected by acid-treatment conditions, wherein more severe conditions result in greater decreases in NSE. The decrease does not seem to be affected by degree of refining, as CSF is relatively stable for all samples, i.e. 600-800.

Initial work on aqueous dilute acid commonly used low-consistency acid treatments (<15% con). These chemical treatments were done at low-consistency due to limitations in mixing equipment, which could not handle high-consistency wood particle slurries. The acid treatment conditions utilized in FIG. 1 approximate the typical conditions used in aqueous dilute acid pretreatment. At these conditions, specific energy consumption is reduced by over 75%.

Example 2

Figure 2:
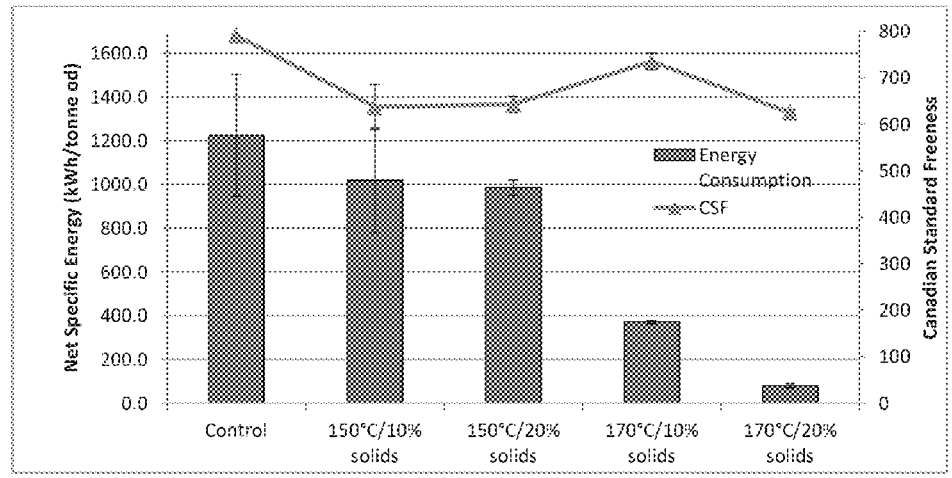
FIG. 2 shows NSE consumption during disc refining of aspen wood chips treated by dilute sulfuric acid at variable consistency and temperature.

Effect of Acid Treatment Consistency and Temperature on NSE Consumption During Disc-Refining of Acid-Treated Aspen Wood Chips The NSE consumed downsize a set of acid-treated Aspen wood chips to a specific CSF is shown in FIG. 2. FIG. 2 directly compares the effects of high- and low-consistency acid treatment. The acid charge and treatment time of the acid treatments were constant at 1.2% and 20 minutes, respectively. Treatment temperature was set at either 150° C. or 170° C., and consistency was set at 10% or 20%. The effect of high-consistency acid treatment on NSE consumption during disc-refining of Aspen chips was shown to have a greater effect than low-consistency acid treatment. At the most severe conditions examined, i.e. 170° C. and 20% con, the NSE consumption was reduced to less than 100 kWh/tonne od. This corresponded to a 95% decrease in NSE consumption and a 57% decrease in gross specific energy (GSE) consumption due to acid treatment of Aspen chips. Further reductions in specific energy consumption would most likely have little effect on overall energy consumption during disc refining, due to the idle energy consumption.

Chemical treatments of wood chips can be performed at higher consistencies than for wood powder or pulp. Cooking at higher consistency, i.e. greater than 20%, is preferable as it means that acid treatments require less water and thus less energy for heating. The efficacy of these treatments, in terms of reducing downsizing energy consumption, is also increased. This effect is most likely due to increased liquor pH for constant acid charge. This is a benefit to treating wood chips rather than wood powder or pulp, as is common for aqueous dilute acid pretreatment.

Figure 3:
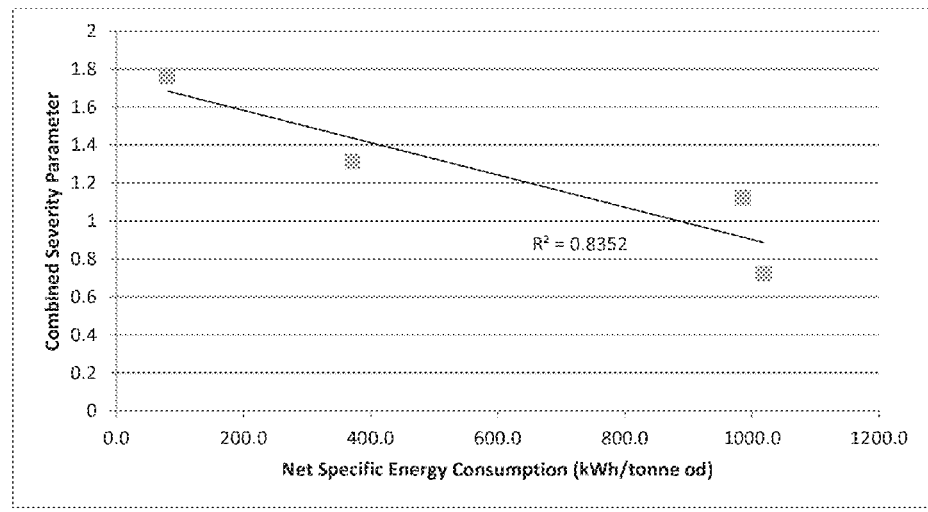
FIG. 3 illustrates the correlation between NSE consumption for refining acid-treated aspen chips and combined severity parameter of acid treatment.

FIG. 3 illustrates the correlation between NSE consumption during refining of acid-treated Aspen chips and the combined severity factor for each individual acid treatment. The combined severity factor is an Arrhenius-type equation incorporating treatment time and temperature and a pH term to account for effective acid concentration. As can be seen, the energy needed to refine a set of acid-treated chips is well correlated with the severity of the given acid treatment. From such a correlation it can be assumed that a further increase in acid treatment severity would reduce energy consumption to near-zero.

Example 3

Figure 4:
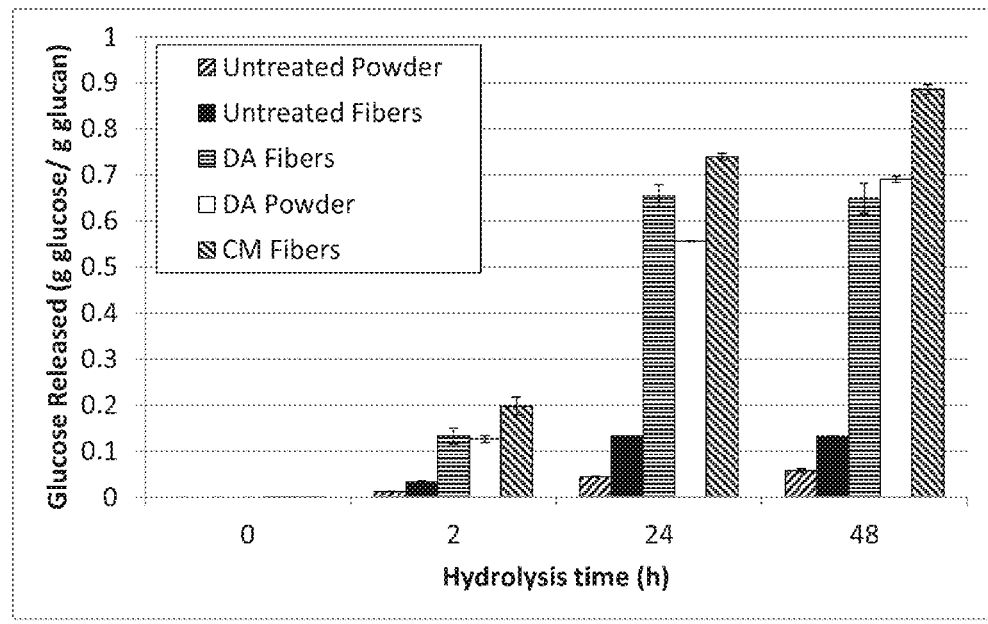
FIG. 4 shows cellulose conversion to glucose following chemi-mechanical pretreatment (CM Fibers) of aspen wood chips, dilute acid pretreatment (DA Powder) of knife-milled aspen, and dilute acid pretreatment (DA Fibers) of disc-refined aspen.

Cellulose Conversion for Aspen Having Undergone Single-Stage Chemimechanical Pretreatment and Single-Stage Aqueous Dilute Acid Pretreatment The cellulose conversion following enzyme hydrolysis of Aspen samples pretreated by a single-stage chemimechanical pretreatment and a single-stage aqueous dilute acid pretreatment is shown in FIG. 4. In certain aspects of the invention, hardwood chips undergo a single-stage acid treatment, followed by mechanical downsizing using a disc-refiner, and then undergo a second acid-treatment. In the following example a single-stage chemimechanical pretreatment is investigated, where the second acid-treatment following disc-refining is omitted. In FIG. 4, this substrate is referred to as CM Fibers. This is compared to two single-stage aqueous dilute acid pretreated substrates, wherein aspen wood chips are mechanically downsized using a knife-mill or disc-refiner, and the resulting particles treated in a dilute sulfuric acid liquor. The substrate produced by a knife-mill is referred to as Powder, and the substrate produced by disc-refining is referred to as Fibers. In FIG. 4, the dilute-acid pretreated powder is called DA Powder, and the dilute-acid pretreated fibers are called DA Fibers.

The aqueous sulfuric acid treatment conditions are the same for both dilute acid pretreated samples and the chemimechanical pretreated sample, i.e. 170° C., 20 min, 20% con and 1.2% AC. All substrates were fractionated using Bauer-McNett following preparation, with the P30-R50 fractions saved for further analysis.

Table 1 outlines the chemical compositions of each pretreated substrate. Comparison of the native Aspen to pretreated Aspen demonstrates the effect of acid treatment, i.e. removal of nearly all hemicellulose, and a small amount of lignin. Comparing the chemical compositions of the chemimechanical pretreated sample to the dilute acid pretreated sample, there is little to no difference. This indicates that the acid treatment was as effective for wood chips as it was for wood particles.

TABLE 1

Chemical Composition of Native Aspen as well as Single-Stage Dilute-Acid Pretreated (DA Powder and DA Fibers) and Chemimechanical Pretreated Aspen (CM Fibers)

|  | Untreated Aspen | | CM Fibers | | DA Fibers | | DA Powder | |
| --- | --- | --- | --- | --- | --- | --- | --- | --- |
|  | Average | St. Error | Average | St. Error | Average | St. Error | Average | St. Error |
| Cellulose | 46.99 | 2.17 | 76.48 | 2.46 | 78.48 | 2.29 | 75.27 | 3.19 |
| Glucan | 46.99 | 2.17 | 76.48 | 2.46 | 78.48 | 2.29 | 75.27 | 3.19 |
| Hemicellulose | 22.68 | 2.27 | 1.50 | 0.13 | 1.06 | 0.14 | 1.16 | 0.06 |
| Mannan | 1.88 | 0.15 | 0.17 | 0.05 | 0.10 | 0.06 | 0.20 | 0.01 |
| Xylan | 20.19 | 2.26 | 1.32 | 0.11 | 0.93 | 0.12 | 0.96 | 0.06 |
| Galactan | 0.29 | 0.08 | 0.00 | 0.00 | 0.00 | 0.00 | 0.00 | 0.00 |
| Arabinan | 0.23 | 0.06 | 0.00 | 0.00 | 0.03 | 0.03 | 0.00 | 0.00 |
| Rham nose | 0.09 | 0.04 | 0.00 | 0.00 | 0.00 | 0.00 | 0.00 | 0.00 |
| Lignin | 26.76 | 1.38 | 21.13 | 0.62 | 17.98 | 1.07 | 22.50 | 0.29 |
| Ash | 0.48 | 0.00 | 0.61 | 0.15 | 0.52 | 0.11 | 0.33 | 0.03 |
| Total | 96.91 | 3.43 | 99.72 | 2.55 | 98.04 | 2.54 | 99.26 | 3.21 |

The difference between chemimechanical pretreatment and dilute acid pretreatment is limited to the order of chemical and mechanical treatment. As seen in FIG. 4, changing the order of chemical and mechanical pretreatment has a significant effect on cellulose conversion of the samples. The CM Fibers are 27% more digestible than either dilute acid pretreated substrate. This indicates that treating wood chips prior to refining results in a physical structure that is more digestible than one which is refined then acid treated.

Example 4

Sample Characterization of Aspen Having Undergone Chemimechanical Pretreatment and Aqueous Dilute Acid Pretreatment FIG. 4 indicated that single-stage chemimechanical pretreatment produced a more digestible substrate than single-stage aqueous dilute acid. As chemical composition and particle size were similar for all substrates, it is likely that physical structure is responsible for the difference in enzyme digestibility between substrates.

Figure 5:
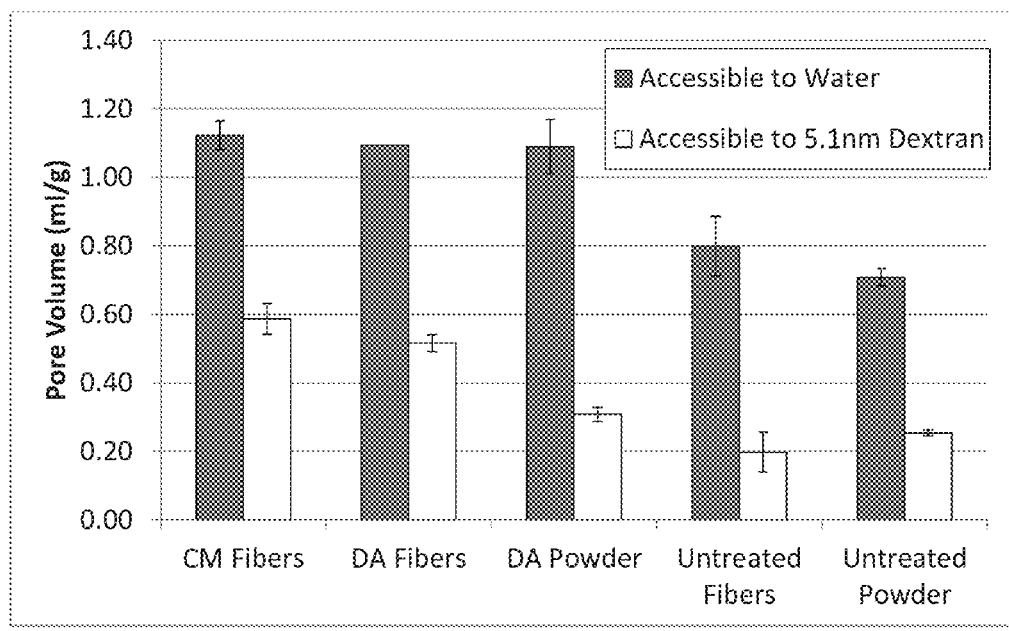
FIG. 5 shows accessible pore volume of samples produced by chemi-mechanical pretreatment (CM Fibers) of wood chips, dilute acid pretreatment (DA Powder) of knife-milled aspen, and dilute acid pretreatment (DA Fibers) of disc-refined aspen.

FIG. 5 shows the accessible pore volume of the single-stage chemimechanical pretreated fiber (CM Fibers), dilute-acid pretreated powder (DA Powder), and dilute-acid pretreated fiber (DA Fibers) substrates from FIG. 4. Pore volume accessible to water is essentially the total pore volume, while pore volume accessible to a 5.1 nm dextran is the portion of the total pore volume which could accommodate a molecule 5.1 nm in diameter. Accessibility of a substrate to a 5.1 nm dextran has been shown to be closely correlated with cellulose conversion during enzyme hydrolysis, as dextrans of this size are thought to approximate the size of a typical cellulase enzyme.

Referring to FIG. 5, there is no difference in the total pore volume of the pretreated samples. However, there are notable differences in the pore volume accessible to an enzyme-sized molecule. In particular, the chemimechanical pretreated sample has the highest accessibility to an enzyme-sized molecule. This may account for the increased cellulose conversion during enzyme hydrolysis when compared to the dilute acid pretreated samples.

Figure 6:
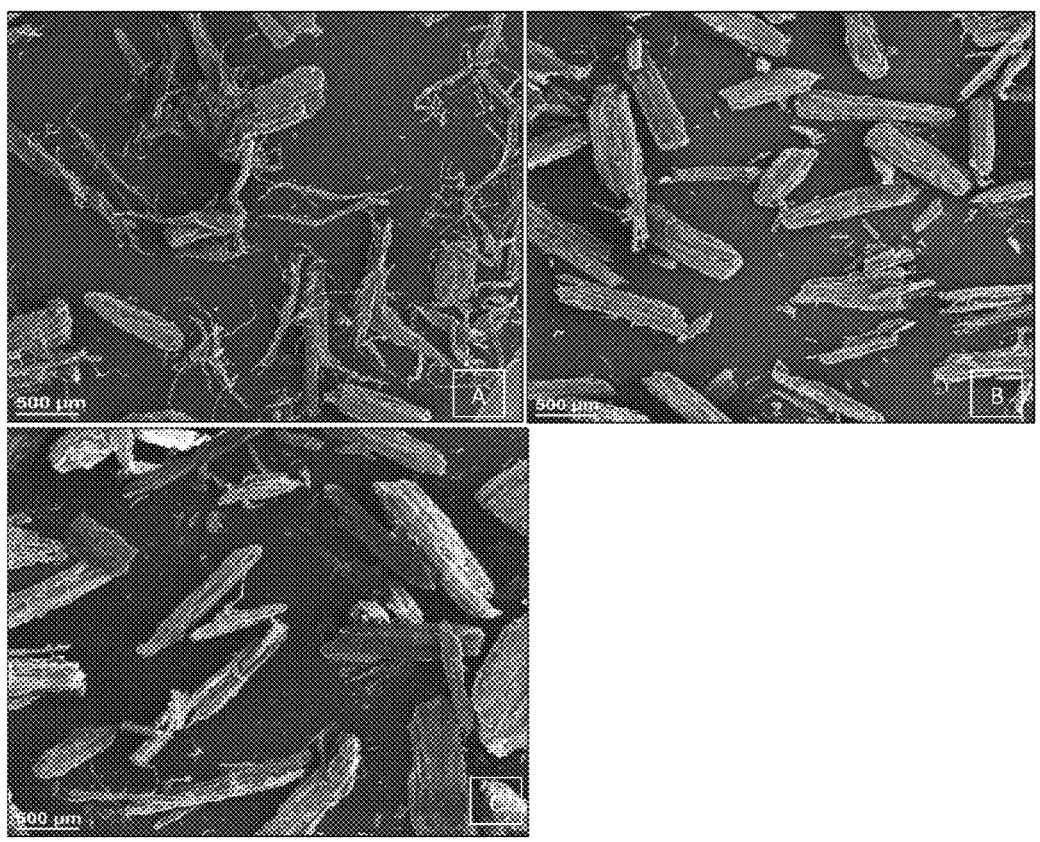
FIG. 6 shows FE-SEM images of (A) chemimechanical pretreated aspen [CM Fibers], (B) fiber-based dilute acid pretreated aspen [DA Fibers], and (C) powder-based dilute acid pretreated aspen [DA Powder] at low magnification demonstrating differences in surface fibrillation and substrate morphology.
Figure 7:
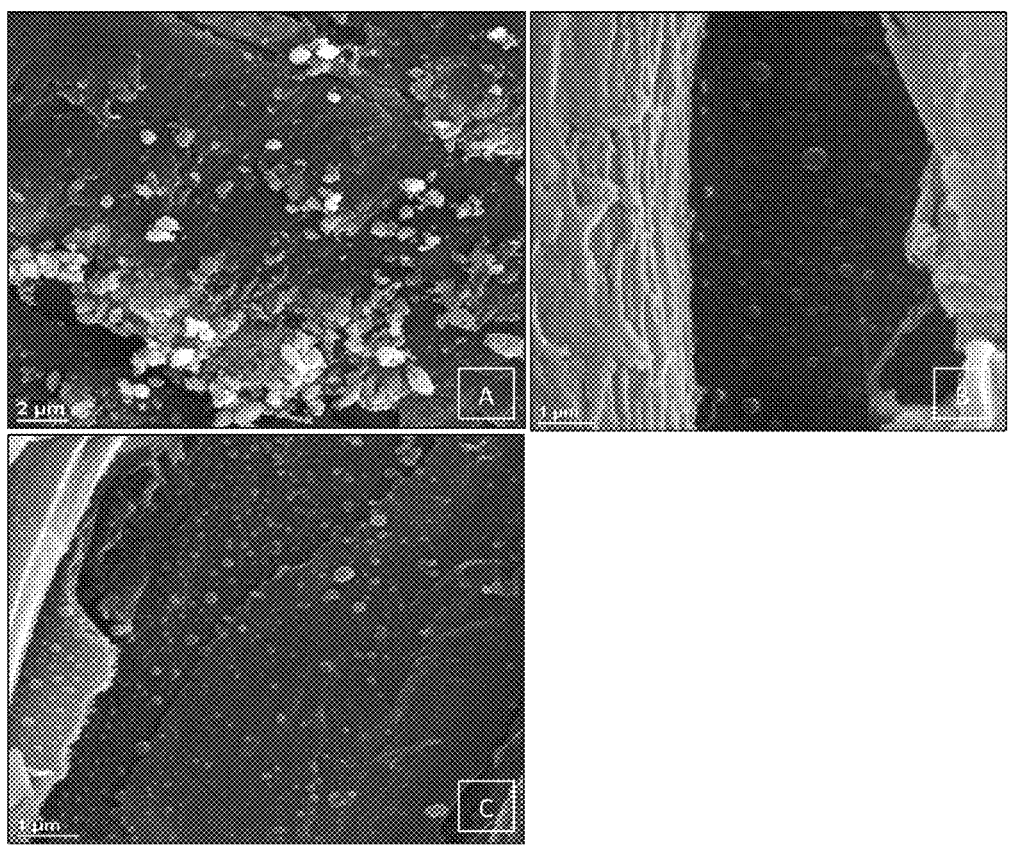
FIG. 7 shows FE-SEM images of (A) chemimechanical pretreated aspen [CM Fibers], (B) fiber-based dilute acid pretreated aspen [DA Fibers], and (C) powder-based dilute acid pretreated aspen [DA Powder] at high magnification demonstrating differences in the surface distribution of redeposited lignin.

FIG. 6 and FIG. 7 include Field Emission Scanning Electron Microscopy (FE-SEM) images of pretreated samples at low and high magnification. FIG. 6 shows the chemi-mechanical pretreated and dilute acid pretreated samples at low magnification. From these images, clear differences in substrate morphology and surface fibrillation can be seen. The chemi-mechanical pretreated sample is more fibrous, while the dilute acid pretreated samples consist of cut fiber bundles. Similarly, the chemi-mechanical pretreated samples show increased surface fibrillation, while the dilute acid pretreated samples are relatively smooth. Fibrous morphology and increased surface fibrillation may provide increased surface area for cellulase adsorption.

These differences in morphology/surface fibrillation can be attributed to the timing of chemical treatment. Prior acid-treatment of wood chips will make it easier for the disc-refiner to separate conjoined fibers and break apart the fiber cell wall, increasing surface fibrillation. For the dilute acid pretreated samples, these features may have been present initially, but subsequently removed by the sulfuric acid treatment. Acid treatment is known to decrease fiber length due to cutting at dislocations. Furthermore, surface fibrillation will generally include significant amounts of amorphous cellulose, which is vulnerable to acid hydrolysis.

FIG. 7 shows the surface of pretreated samples at high magnification. The spherical molecules present are lignin which has condensed during the acid treatment and relocated to the surface. The pattern of lignin redeposition for dilute acid pretreated samples is in agreement with past research examining this phenomenon. However, the pattern of lignin redeposition for chemimechanical pretreated samples is quite different. The lignin molecules appear to be more bunched together, larger, and less spherical. This may be due to the chemical treatment of wood chips rather than particles. Lignin movement would most likely be more restricted within the extracellular matrix of the wood chip, resulting in a different pattern of redeposition. Furthermore, disc-refining during the single-stage chemimechanical pretreatment occurs after the lignin redeposition phenomenon, which can also affect surface features. Differences in lignin surface distribution could affect the enzyme digestibility of a sample by altering the rate of non-productive binding between lignin and cellulase.

Example 5

Effect of Drying on Cellulose Conversion of Chemimechanical Pretreated Aspen

Grinding of wood to powder prior to chemical treatment is common for aqueous dilute acid. The majority of grinding has been done on air-dried wood. This is to reduce heat build-up and screen blockage during the milling of wood. However, air-drying of wood has an unintended side-effect. Significant drying of wood will result in hornification of the cell walls. Hornification is a process wherein there is a loss of pore volume following drying and re-wetting of a wood substrate. As pore volume is highly correlated with enzyme digestibility, this loss of pore volume negatively affects enzyme hydrolysis yields.

Figure 8:
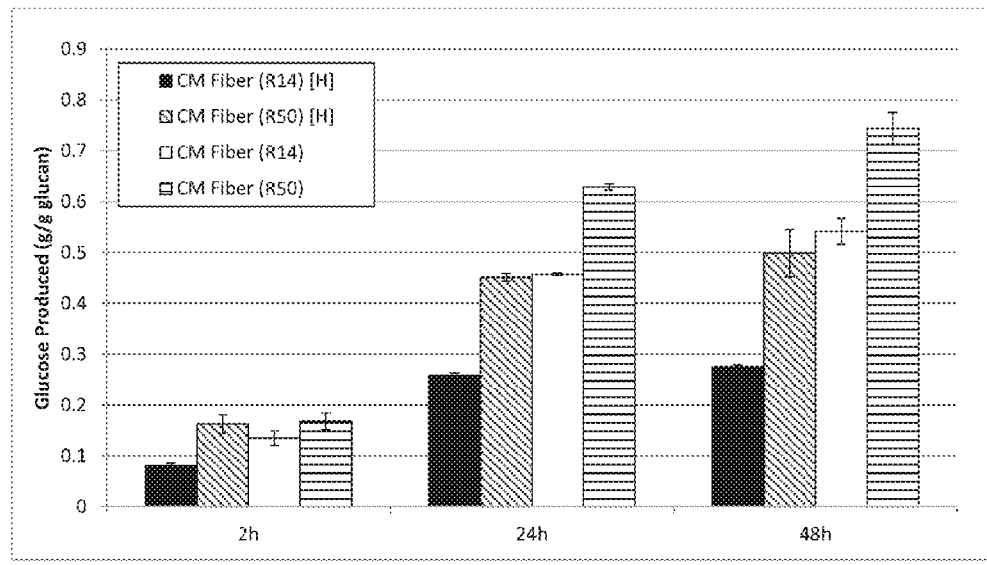
FIG. 8 shows the effect of hornification on chemimechanical [CM] pretreated aspen at two particle size fractions.

FIG. 8 demonstrates the effects of air-drying on the cellulose conversion of chemimechanical pretreated Aspen for two particle size fraction, i.e. R14 and P30-R50. The [H] is used to describe samples which have been dried and re-wetted, as opposed to never-dried samples. The acid treatment for these samples used the following conditions, 170° C., 20 min, 20% con, 1.2% AC. As can be seen, there is a significant decrease in cellulose conversion following air-drying.

Figure 9:
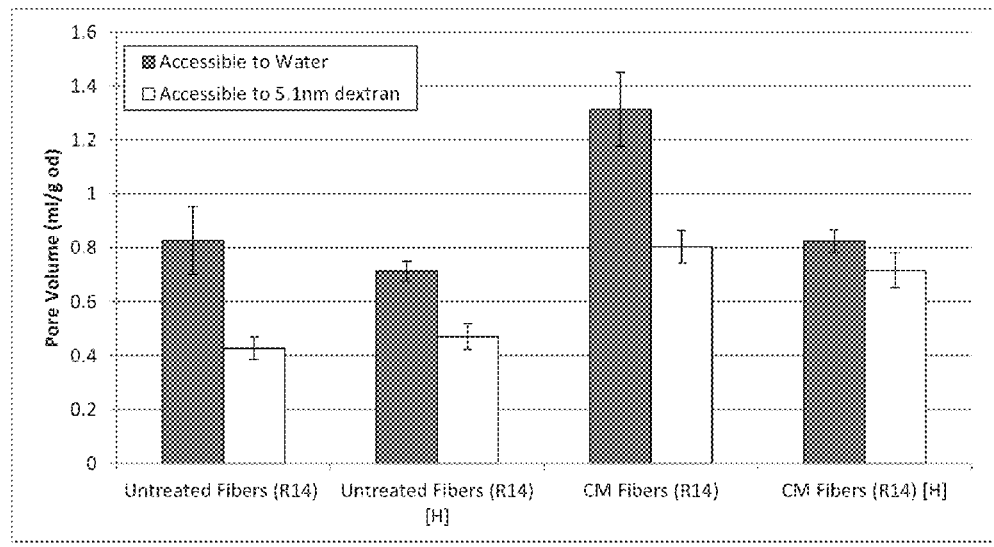
FIG. 9 shows the effect of hornification on accessible pore volume of untreated and chemimechanical [CM] pretreated aspen.

FIG. 9 shows the effects of air-drying on the accessible pore volume of chemimechanical pretreated aspen and non-chemically treated aspen at the particle size fractions, i.e. R14 and P30-R50. These are the same aspen samples used in FIG. 8. As can be seen, there is a commensurate decrease in accessible pore volume following air-drying. Thus air-drying aspen prior to downsizing has a significant negative effect on the cellulose conversion via a decrease in pore volume that is accessible to cellulase enzymes.

Such an effect is an important factor in choosing a method of downsizing, particularly when the downsizing step follows the chemical treatment. Thus the ability for a milling method to handle wet wood is a requisite when used as part of a pretreatment method. Of all the milling methods available, disc-refining best fulfills this requirement, as refining has been used within the pulping industry to process wet woods for over 50 years.

Example 6

Effect of Downsizing Method on Cellulose Conversion of Chemimechanical Pretreated Aspen Different forms of mechanical downsizing will produce substrates with different physical structures. As enzyme hydrolysis relies on physical adsorption of the enzyme to the cellulose substrate, the physical structure of the downsized substrate is important. A form of dry grinding is most commonly used to downsize wood for pretreatment. However these methods will generally create a wood powder, which consists primarily of cut or truncated fiber bundles. Disc-refining fractures the wood chip at the fiber-fiber interface, resulting in single fibers and smaller fiber-bundles. Past research has indicated that a fibrous substrate is significantly more digestible than a powder-substrate. Examples 1 to 5 have examined a single-stage chemimechanical pretreatment utilizing acid-treatment of wood chips followed by disc refining, termed CM Fibers. A different single-stage chemi-mechanical pretreatment can be used, where wood chips are acid treated then downsized by dry knife-milling, producing a CM Powder.

Figure 10:
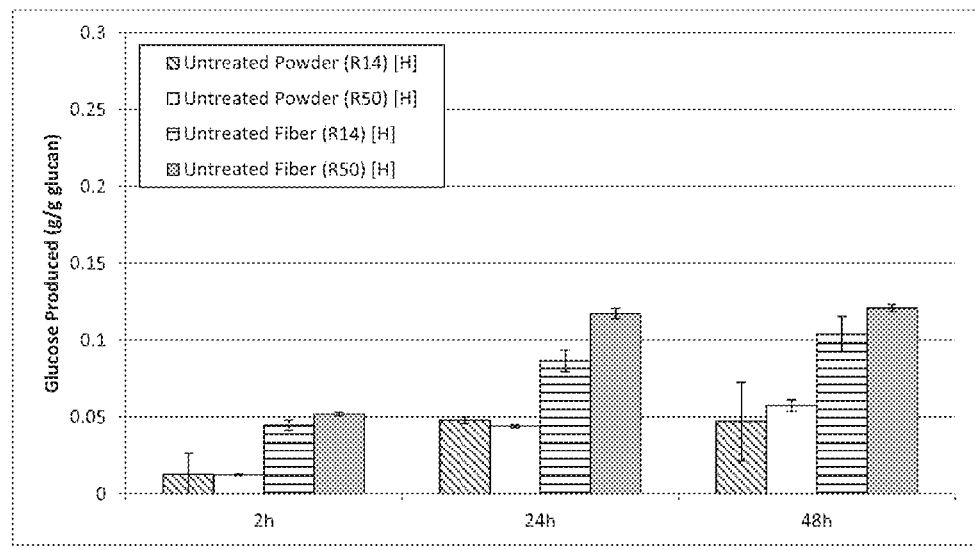
FIG. 10 shows the effect of particle shape on cellulose conversion to glucose for untreated wood particles from knife milling (powder) and disc refining (fibers)

FIG. 10 shows the effect of the downsizing method on cellulose conversion to glucose for untreated wood particles from knife milling (powder) and disc refining (fibers). It should be noted that all samples shown in FIG. 10 have been air-dried and rewetted. This is to remove the complicating factor of hornification from a comparison of fibers and powder. As can be seen, the cellulose conversion of aspen fibers is nearly twice that of aspen powder.

Figure 11:
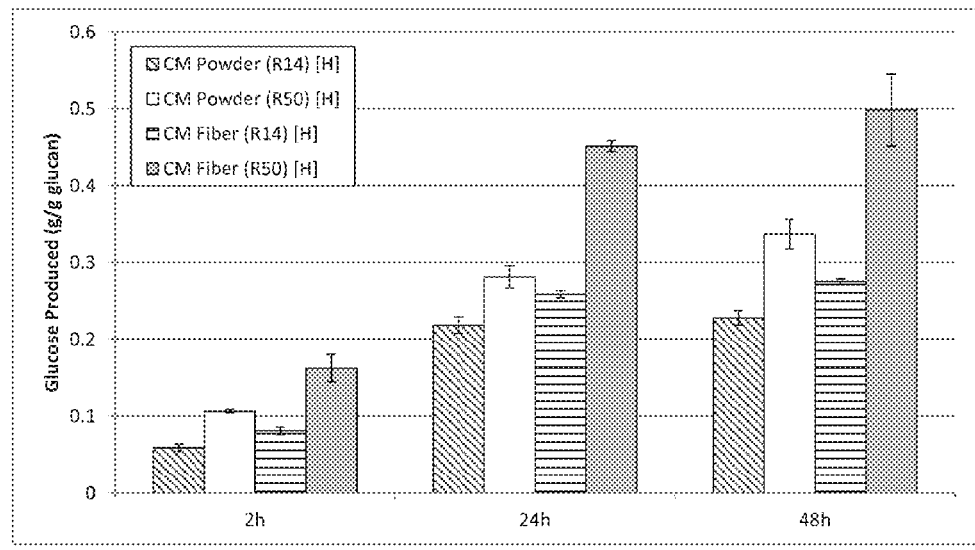
FIG. 11 shows the effect of particle shape on cellulose conversion to glucose for chemimechanical [CM] pretreated wood particles from knife milling (powder) and disc refining (fibers)

FIG. 11 shows the effect of the downsizing method on cellulose conversion to glucose for sulfuric acid treated wood chips that have been downsized by knife milling (chemimechanical powder) or by disc refining (chemimechanical fibers). The results shown in FIG. 11 are in agreement with the results in FIG. 10, that fiber particles are markedly more digestible than powder particles.

Figure 12:
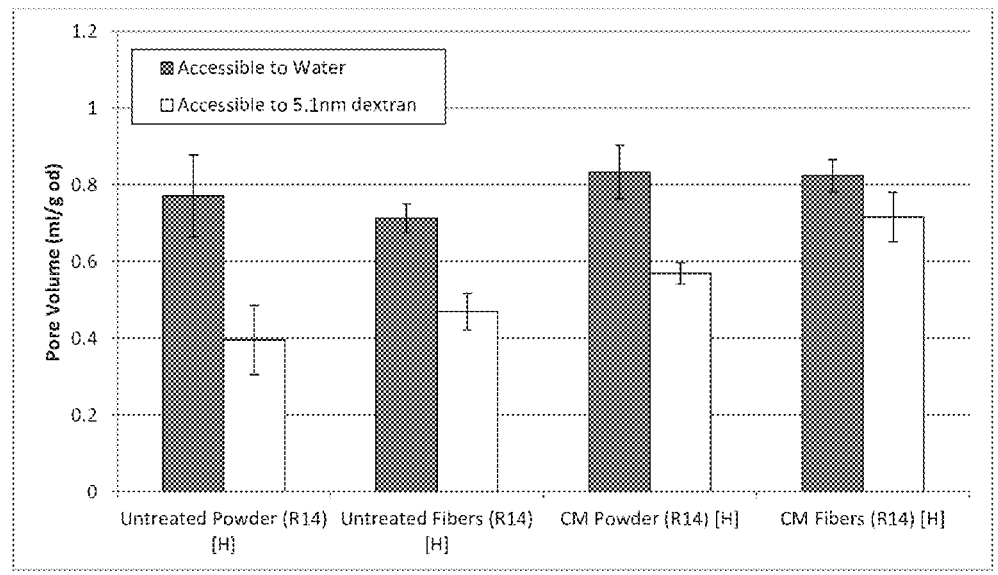
FIG. 12 shows the effect of particle shape on accessible pore volume for chemimechanical [CM] pretreated wood particles from knife milling (powder) and disc refining (fibers).

FIG. 12 shows the accessible pore volume of the untreated and pretreated aspen samples. The fiberous samples (untreated and chemimechanical pretreated) show increased accessibility to an enzyme-sized dextran compared to the powderous samples (untreated and chemimechanical). Thus the difference in morphology between the fibers and powders appears to impact pore accessibility. This may account for the increased cellulose conversion of untreated and pretreated fibers. Based on these results, using a disc-refiner to mechanically downsize acid-treated wood chips is preferable, as the resulting substrate is significantly more digestible by cellulase enzymes.

Example 7

Effect of Single-Stage Acid Treatment on Specific Energy Consumption of Downsizing for Spruce Table 2 shows the net specific energy consumed to disc-refine spruce which has undergone a single-stage dilute acid treatment. In certain embodiments of the invention, softwood chips undergo a single- or two-stage chemical treatment in dilute sulfuric acid liquor prior to mechanical downsizing by disc-refining. Spruce chips were treated in dilute sulfuric acid liquor using either a small Parr-type reactor, or a larger rotating autoclave-type reactor. The Parr-type reactor did not include agitation of the contents, but was able to achieve a higher set-temperature than the autoclave reactor. Acid treatment conditions of temperature, time, consistency, and acid charge were varied. As can be seen, acid treatment of spruce results in a decrease of over 90% in the net specific energy consumed during mechanical downsizing using a disc-refiner. Furthermore, the reduction in NSE consumption appears to increase as treatment conditions become more severe.

TABLE 2

Net Specific Energy Consumption to Refine Acid-Treated Spruce Chips
Refining consistency: 25%, Feeding rate: ~60 g/min (o.d.)

| Reactor | Acid Charge (% w/w) | Temperature (° C.) | Pretreatment Time (min) | Treatment Consistency (%) | Disc Gap (mm) | GSE (kwh/t) | NSE (kWh/t) |
|---|---|---|---|---|---|---|---|
| Parr-type | 5 | 200 | 10 | 5 | 1.0 | 672.7 | 18.2 |
| Parr-type | 5 | 190 | 10 | 5 | 1.0 | 842.0 | 191.6 |
| Parr-type | 5 | 170 | 10 | 5 | 1.0 | 1311.7 | 786.7 |
| Autoclave-type | 5 | 175 | 30 | 20 | 1.0 | 815.2 | 24.4 |
| Autoclave-type | 3 | 175 | 30 | 20 | 1.0 | 760.2 | 18.3 |
| Autoclave-type | 5 | 160 | 30 | 20 | 1.0 | 935.5 | 218.6 |
| Untreated | N/A | N/A | N/A | N/A | 1.0 | 1553.3 | 792.1 |
| Untreated | N/A | N/A | N/A | N/A | 0.6 | 1586.7 | 825.5 |
| Untreated | N/A | N/A | N/A | N/A | 0.8 | 1593.3 | 1033.3 |
| Untreated | N/A | N/A | N/A | N/A | 1.0 | 1533.3 | 973.3 |

Example 8

Figure 13:
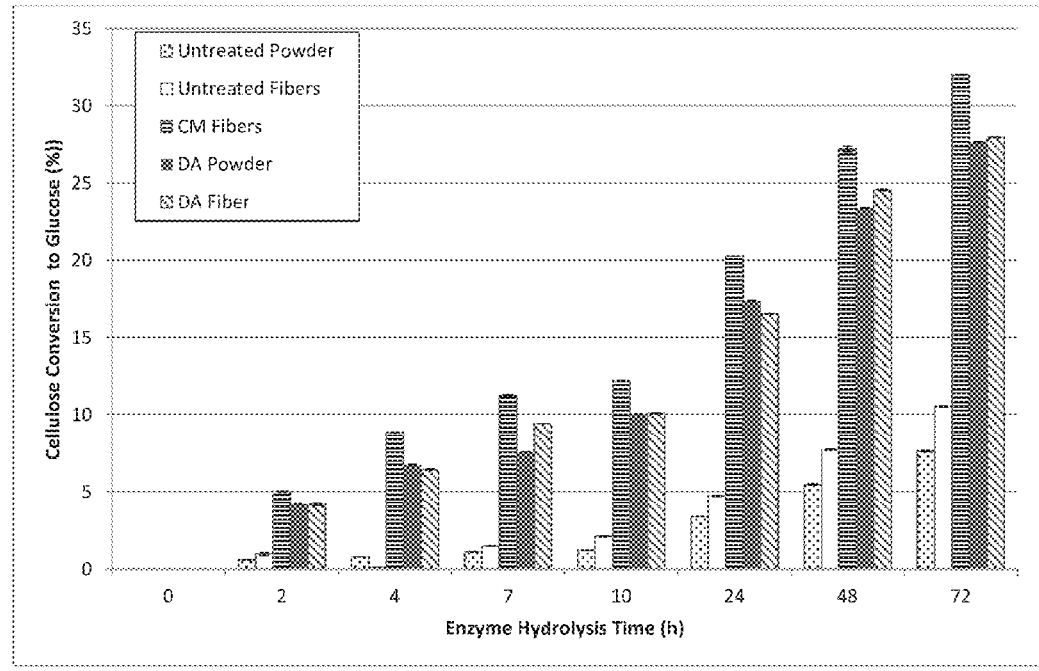
FIG. 13 shows the cellulose conversion following enzyme hydrolysis of spruce substrates which had undergone a single-stage chemimechanical pretreatment (CM Fibers), disc-refining followed by dilute-acid pretreatment (DA Fibers) and knife-milling followed by dilute-acid pretreatment (DA Powder).

Cellulose Conversion Following Enzyme Hydrolysis of Single-Stage Chemimechanical and Aqueous Dilute Acid Pretreated Spruce The cellulose conversion following enzyme hydrolysis of Spruce samples pretreated by a single-stage chemimechanical pretreatment and a single-stage aqueous dilute acid pretreatment is shown in FIG. 13. In certain aspects of the invention, softwood chips undergo a single-stage acid treatment, followed by mechanical downsizing using a disc-refiner, and then undergo a second acid-treatment. In the following example a single-stage chemimechanical pretreatment is investigated, where the second acid-treatment following disc-refining is omitted. In FIG. 13, this substrate is referred to as CM Fibers. This is compared to two single-stage aqueous dilute acid pretreated substrates, wherein aspen wood chips are mechanically downsized using a knife-mill or disc-refiner, and the resulting particles treated in a dilute sulfuric acid liquor. In FIG. 13, the dilute-acid pretreated powder is called DA powder, and the dilute-acid pretreated fibers are called DA Fibers.

The aqueous sulfuric acid treatment conditions are the same for both dilute acid pretreated samples and the chemimechanical pretreated sample, i.e. 190° C., 10 min, 5% con and 5% AC. Table 3 outlines the chemical compositions of each pretreated substrate. Comparison of the native Spruce to pretreated Spruce demonstrates the effect of acid treatment, i.e. removal of most hemicellulose, and a small amount of lignin and cellulose. Comparing the chemical compositions of the chemimechanical pretreated sample to the dilute acid pretreated samples, there is little to no difference. This indicates that the acid treatment was as effective for wood chips as it was for wood particles. As seen in FIG. 13, the single-stage chemimechanical pretreated substrate is significantly more digestible than either dilute acid pretreated substrate at all time-points.

TABLE 3

Chemical Composition of Native Spruce and Single-Stage Dilute-Acid Pretreated (DA Powder and DA Fibers) and Chemimechanical Pretreated (CM Fibers) Spruce

| | Cooking Conditions | | | | Chemical Composition | | |
|---|---|---|---|---|---|---|---|
| Sample Type | Temp (° C.) | Acid Charge (%) | Time (min) | Mass Yield (%) | Cellulose (%) | Hemicellulose (%) | Lignin & Ash (%) |
| Untreated | n/a | n/a | n/a | 100 | 40.0 | 18.6 | 41.3 |
| CM Fibers | 190 | 5 | 10 | 63.4 | 58.5 | 0.2 | 41.3 |
| DA Powders | 190 | 5 | 10 | 61.1 | 58.6 | 0.2 | 41.2 |
| DA Fibers | 190 | 5 | 10 | 62.3 | 58.5 | 0.1 | 41.4 |

Example 9

Characterization of Single-Stage Chemimechanical (CM) and Dilute Acid (DA) Pretreated Spruce FIG. 13 indicated that single-stage chemimechanical pretreatment produced a more digestible substrate than both aqueous dilute-acid pretreated substrates. As chemical composition is similar between pretreated substrates, differences in enzyme digestibility of substrates can be attributed to differences in physical size and structure.

Table 4 shows the particle size analysis of the CM Fibers, DA Powder and DA Fibers produced from spruce. In this case, the R14 size-fraction was removed via Bauer-McNett fractionation, and the P14 fraction analyzed using a Fiber Quality Analyzer (FQA). As can be seen, the CM Fiber substrate has the greatest R14 fraction and the highest particle length, indicating that the substrate is larger than the DA Powder and DA Fiber substrates. Based on this, it does not appear that differences in particle size account for the higher digestibility of the CM Fiber substrate. However, based on FQA data, the CM Fibers do appear to be more fibrillated than either the DA Powder or DA Fibers, having both an increased length and decreased coarseness, i.e. width. This difference in morphology may account for some of the difference in enzyme digestibility between pretreated substrates.

TABLE 4

Particle Size Analysis of Single-Stage Dilute Acid (DA Fibers and DA Powder) and Chemimechanical (CM Fibers) Pretreated Spruce

| Sample | R14 Mass Percentage (%) | P14 Mass Percentage (%) | Coarseness (mg/m) | Length Weighted (mm) |
|---|---|---|---|---|
| CM Fibers | 19.087 | 80.913 | 0.233 | 0.58 |
| DA Powders | 14.828 | 85.172 | 0.324 | 0.43 |
| DA Fibers | 7.468 | 92.532 | 0.289 | 0.32 |

Figure 14:
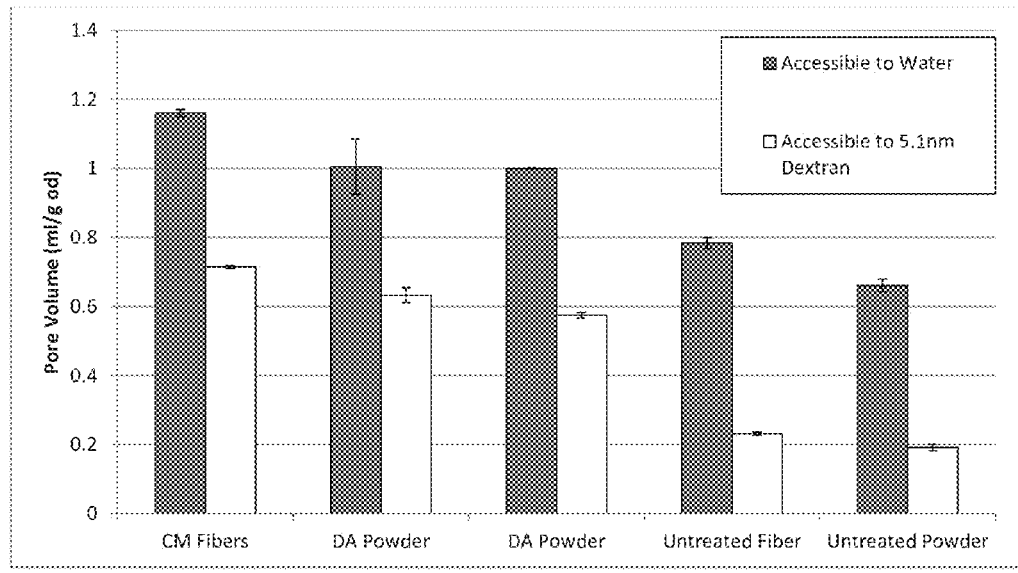
FIG. 14 shows the accessible pore volume of spruce substrates which had undergone a single-stage chemimechanical pretreatment (CM Fibers), disc-refining followed by dilute-acid pretreatment (DA Fibers) and knife-milling followed by dilute-acid pretreatment (DA Powder).

FIG. 14 shows the pore accessibility of the CM Fiber, DA Powder and DA Fiber substrates. As can be seen, the CM Fiber substrate has higher overall pore volume and higher pore volume accessible to a 5.1 nm dextran. As accessibility to a 5.1 nm dextran has been correlated with overall enzyme digestibility of a substrate, the increase in accessibility may help account for the higher digestibility of the single-stage chemimechanical pretreated substrate.

Example 10

Figure 15:
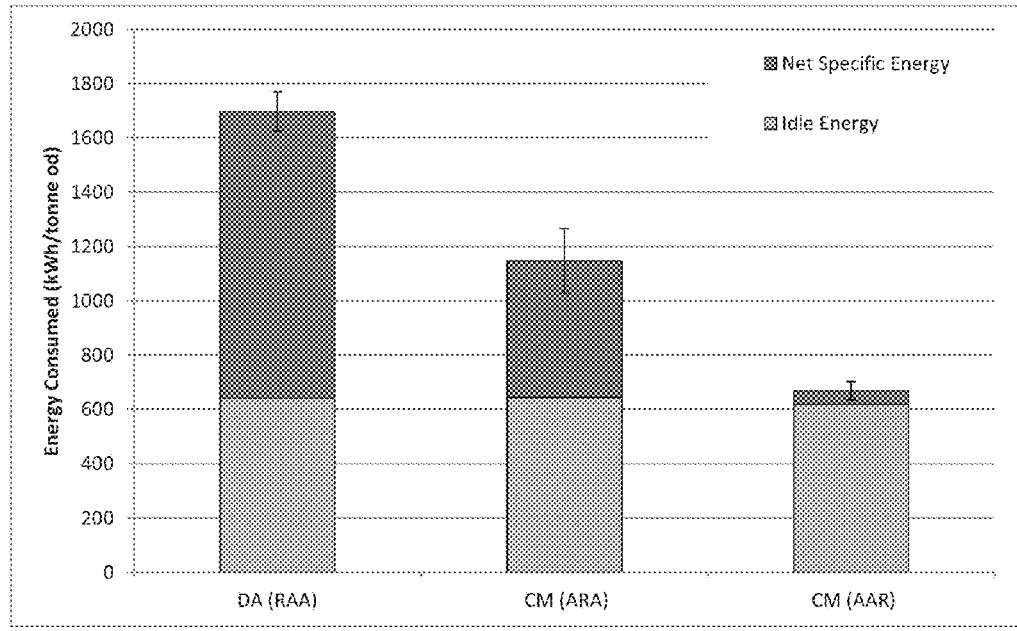
FIG. 15 shows the NSE consumed during disc-refining to prepare spruce substrates which had undergone a two-stage chemimechanical pretreatment involving two-stage acid-treatment of wood chips followed by disc-refining (CM-AAR), a two-stage chemimechanical pretreatment involving acid-treatment of wood chips, followed by disc-refining, then followed by a second acid treatment (CM-ARA), and a two-stage dilute acid pretreatment involving disc-refining followed by a two-stage acid pretreatment (DA-RAA)

Effect of Two-Stage Acid Treatment on Specific Energy Consumption of Downsizing for Spruce FIG. 15 shows the net specific energy consumed in three pretreatments of spruce wood chips. In certain aspects of the invention, wood chips will be treated in a dilute sulfuric acid liquor at mild conditions followed by disc-refining to a fibrous particle substrate, which is then treated in a dilute sulfuric acid liquor at severe conditions, here termed Chemimechanical ARA (CM-ARA). In certain aspects of the invention, Wood chips will be treated in a dilute sulfuric acid liquor at mild conditions, then in another dilute acid liquor at severe conditions followed by disc-refining to a fibrous particle substrate, here termed Chemimechanical AAR (CM-AAR). The first pretreatment is a two-stage dilute-acid (DA) pretreatment in which woodchips are downsized by disc refining and the resulting material is subjected to a two-stage acid treatment. The conditions of the first acid treatment were relatively mild: 170° C., 20 min, 2% AC, 20% solids, and the conditions of the second acid treatment were relatively severe in comparison to the first acid treatment step: 200° C., 5 min, 5% AC, 5% solids. The second and third pretreatments of this example are chemi-mechanical pretreatments illustrative of the invention. In one of these, wood chips are treated under the relatively mild conditions followed by disc refining to a fibrous particle substrate, which was then treated under the relatively severe conditions, here termed chemi-mechanical ARA (CM-ARA) pretreatment. In the other, wood chips were treated under the relatively mild conditions, then under the relatively severe conditions followed by disc-refining to a fibrous particle substrate, here termed chemimechanical AAR (CM-AAR) pretreatment. The chemimechanical pretreatments of spruce resulted in a decrease in the net specific energy required to downsize to a pulp substrate in comparison to the DA pretreatment. For the CM-AAR pretreatment regime, where wood chips were acid-treated two times prior to downsizing, there was a 95% reduction in net specific energy consumption. For the CM-ARA regime, where wood chips where chips were subjected to disc refining between the two acid treatment steps, there was a 52% reduction in net specific energy consumption in comparison to the DA pretreatment.

Table 5 outlines the particle size analysis of the DA, CM-ARA and CM-AAR substrates. Results indicate that there were differences in particle size, with the DA substrate being the largest, followed by CM-AAR and CM-ARA, respectively. As the resulting particle size can impact the energy consumed during the downsizing procedure, there was concern that any differences in net specific energy consumed could be attributed to differences of final particle size. As can be seen, the substrate which consumed the most energy to downsize, DA, also had the largest particle size, indicating that particle size effects were not significant. Furthermore, the trend in particle size did not follow the trend in energy consumption.

TABLE 5

Particle Size Analysis of Two-stage Dilute-Acid (DA) and Chemimechanical (CM) Pretreated Spruce

| Sample | SEC (kWh/tonne od) | R14 Fraction Mass % | P14 Fraction Mass % | Length (mm) | Coarseness (mg/m) | % Fines |
|---|---|---|---|---|---|---|
| CM-AAR | 49 | 13.5 | 86.5 | 0.735 | 0.290 | 83.1 |
| CM-ARA | 504 | 6.2 | 93.8 | 0.236 | 0.328 | 91.5 |
| DA | 1057 | 27.5 | 72.5 | 0.499 | 0.349 | 80.8 |

Example 11

Figure 16:
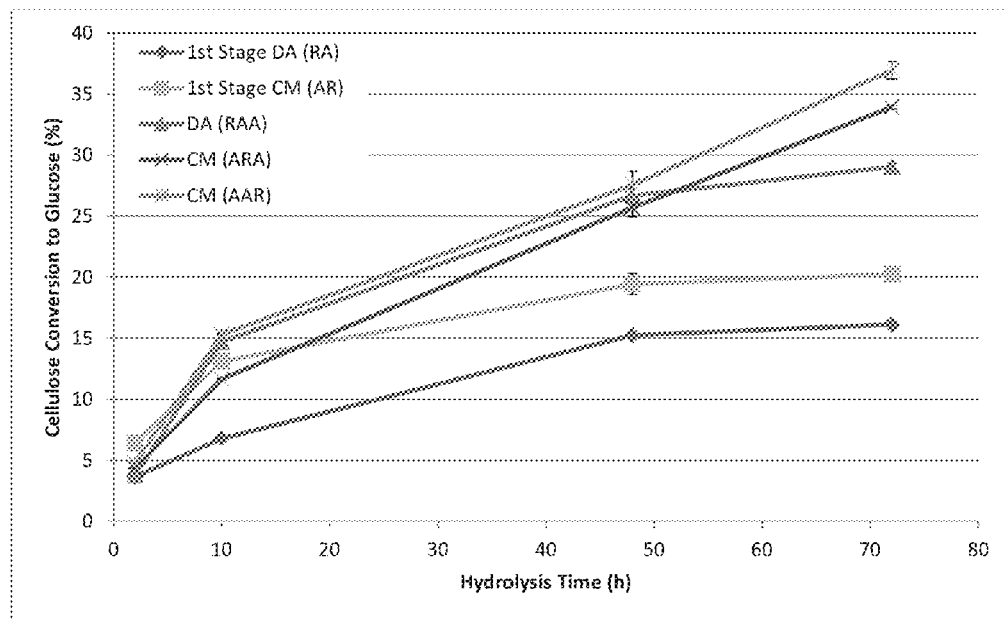
FIG. 16 shows the cellulose conversion following enzyme hydrolysis at 15 FPU/g glucan of spruce substrates which had undergone CM-AAR pretreatment, CM-ARA pretreatment, and DA-RAA pretreatment.

Cellulose Conversion of Spruce Having Undergone Two-Stage Chemimechanical and Two-Stage Aqueous Dilute Acid Pretreatment FIG. 16 outlines the cellulose conversion to glucose following enzyme hydrolysis of the CM-ARA, CM-AAR and DA substrates described in Example 10, as well as the first-stage substrates of CM-ARA and DA. Enzyme hydrolysis trials in FIG. 16 were all run at a dosage of 15 FPU/g glucan. Enzyme hydrolysis yields of two-stage pretreated substrates shows that the CM-AAR substrate yields the highest cellulose conversion, followed by the CM-ARA and DA substrates, respectively. These results indicate that two-stage treatment of wood chips in a dilute sulfuric acid liquor prior to refining produces a more digestible substrate than downsizing prior to either acid-treatment stage.

Figure 17:
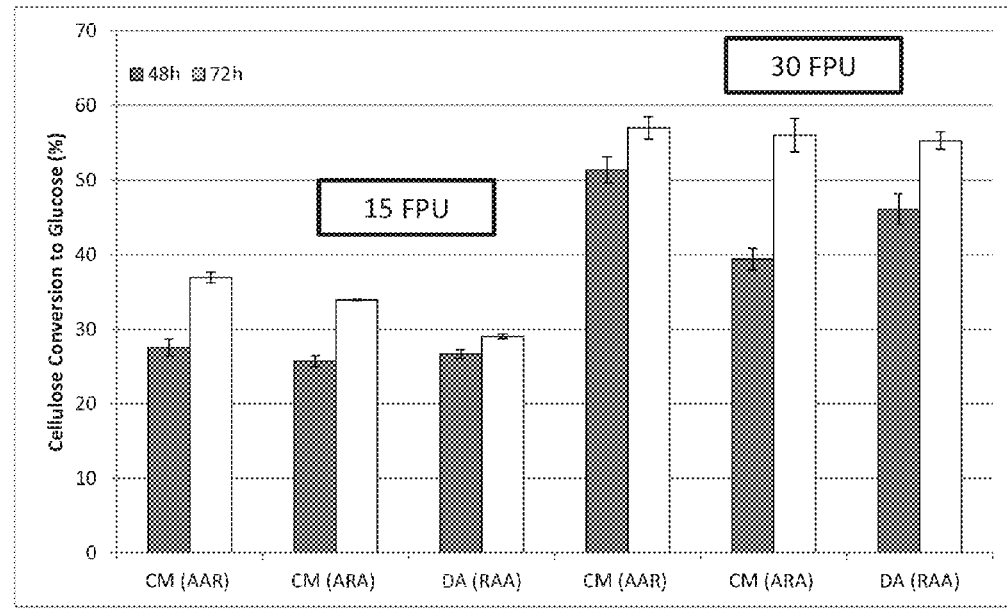
FIG. 17 shows the cellulose conversion following enzyme hydrolysis at 15 and 30 FPU/g glucan of spruce substrates which had undergone CM-AAR pretreatment, CM-ARA pretreatment, and DA-RAA pretreatment.

FIG. 17 compares the cellulose conversion to glucose following enzyme hydrolysis of the CM-ARA, CM-AAR and DA substrates at 15 and 30 FPU/g glucan. The 30 FPU/g glucan dosage is more common in dilute-acid pretreatment studies of spruce. Increasing the enzyme dosage results in a significant increase in overall digestibility of the two-stage pretreated substrates. In particular, the CM-AAR substrate is still the most digestible for a 48 h enzyme hydrolysis trial, over both the CM-ARA and DA pretreated substrates.

Table 6 shows the chemical composition for the CM-AAR, CM-ARA and DA substrates following the first- and second-stage acid-treatment. As can be seen, the chemical composition of each substrate did not differ significantly, indicating that any differences seen in cellulose conversion during enzyme hydrolysis did not arise from differences in the acid treatment stages.

TABLE 6

Chemical Composition of Native Spruce as well as Two-stage Dilute-acid (DA) Pretreated Spruce, Two-stage ARA Chemimechanical (CM-ARA) Pretreated Spruce and Two-stage AAR Chemimechanical (CM-AAR) Pretreated Spruce

| Pretreatment Sample Type | Stage | Chemical Composition (%) | | | | Mass Yield (%) |
|---|---|---|---|---|---|---|
| | | Cellulose | Hemicellulose | Lignin | Total | |
| Untreated | N/A | 47.4 | 21.0 | 29.7 | 98.1 | 100 |
| Dilute Acid | 1 | 58.6 | 0.0 | 41.2 | 99.8 | 68.5 |
| | 2 | 49.2 | 0.0 | 51.6 | 100.8 | 72.8 |
| Chemimechanical (ARA) | 1 | 52.7 | 0.7 | 46.4 | 99.7 | 73.1 |
| | 2 | 47.6 | 0.0 | 52.2 | 99.8 | 70.0 |
| Chemimechanical (AAR) | 1 | 52.7 | 0.7 | 46.4 | 99.7 | 73.1 |
| | 2 | 47.6 | 0.5 | 52.0 | 100.1 | 72.6 |

Example 12

Figure 18:
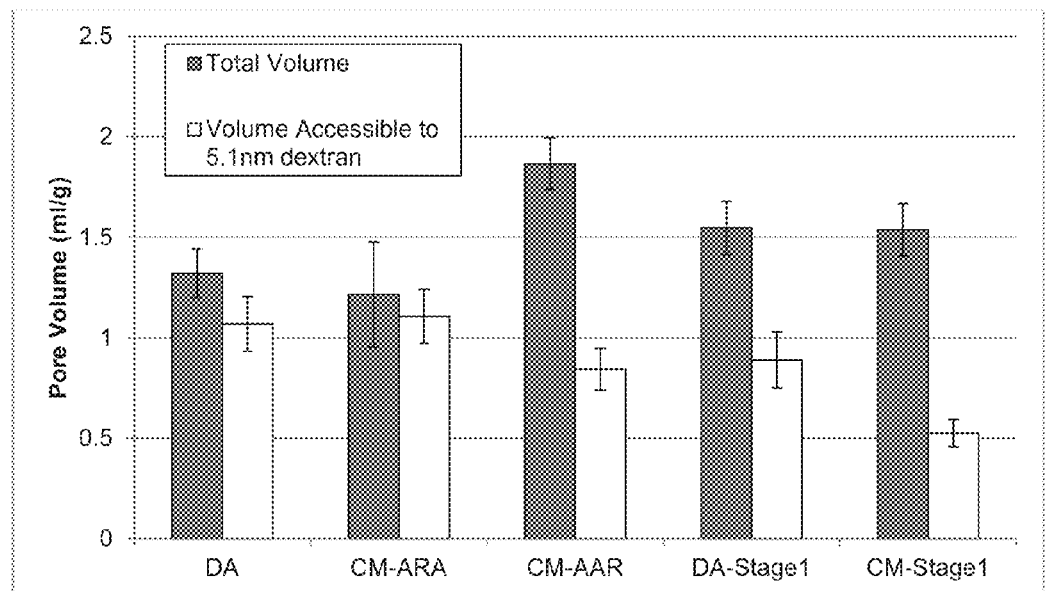
FIG. 18 shows the accessible pore volume of spruce substrates which had undergone CM-AAR pretreatment, CM-ARA pretreatment, and DA-RAA pretreatment.

Accessible Pore Volume of Two-Stage Dilute Acid Pretreated Spruce and Two-Stage Chemimechanical Pretreated Spruce FIG. 18 shows the accessible pore volume of the CM-AAR, CM-ARA and DA spruce substrates. Included are pore volume accessible to water, and pore volume accessible to a 5.1 nm dextran. The CM-AAR substrate has a higher total pore volume than both the CM-ARA and DA substrates, which accessibility to a 5.1 nm dextran is similar between the three substrates. The higher pore volume may explain the higher digestibility of the CM-AAR substrate.

The content of all references referred to herein are incorporated herein by reference as though reproduced in their entirety.

REFERENCES

Sluiter, A., Hames, B., Ruiz, R., Scarlata, C., Sluiter, J., & Templeton, D. (2008). Determination of Sugars, Byproducts, and Degradation Products in Liquid Fraction Process Samples. *NREL Laboratory Analytical Procedure (LAP)*.

Sluiter, A., Hames, B., Ruiz, R., Scarlata, C., Sluiter, J., Templeton, D., & Crocker, D. (2011). Determination of Structural Carbohydrates and Lignin in Biomass. *NREL Laboratory Analytical Procedure (LAP)*.

Stone, J. E., & Scallan, A. M. (1968). A Structural Model for the Cell Wall of Water-Swollen Wood Pulp Fibers based on their Accessibility to Macromolecules. *Cellulose Chemistry and Technology*, 2, 343-353.

What is claimed is:

1. A method for treating wood chips, the method comprising the steps of:
    (i) exposing a first mixture comprising the wood chips and an aqueous sulfuric acid solution, between about 1.0 and about 1.5% (w/w), at a temperature of between about 150° C. and about 180° C. for a period of time between about 15 and about 30 minutes, wherein the mixture has a consistency of between about 10 and about 25%, to at least partially hydrolyze hemicellulose of the wood chips;
    (ii) removing xylose and mannose produced in step (i) from the mixture;
    (iii) exposing a second mixture comprising the wood chips produced in step (i) and an aqueous sulfuric acid solution, between about 3.0 and about 10% (w/w), at a temperature of between about 180° C. and about 220° C., wherein the second mixture has a consistency of between about 10 and about 25%, to at least partially hydrolyze hemicellulose of the wood chips; and
    (iv) physically reducing the wood chips produced in step (iii) by disc refining to produce cellulosic fibers which will undergo hydrolysis to produce glucose at a yield of at least 90% in presence of a cellulase dosage of 15 FPU/g glucan, and wherein net specific energy consumed in step (iv) is reduced by between 70 and 95 percent when compared to disc refining of the same amount of wood chips not subjected to acid treatment under the same disc refining conditions of step (iv).

* * * * *